(12) United States Patent
Li et al.

(10) Patent No.: US 8,473,922 B2
(45) Date of Patent: Jun. 25, 2013

(54) RUNTIME MONITORING IN COMPONENT-BASED SYSTEMS

(75) Inventors: Jun Li, Menlo Park, CA (US); Keith Moore, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2868 days.

(21) Appl. No.: 09/955,764

(22) Filed: Sep. 19, 2001

(65) Prior Publication Data

US 2003/0056200 A1    Mar. 20, 2003

(51) Int. Cl.
*G06F 9/44* (2006.01)
*G06F 15/16* (2006.01)

(52) U.S. Cl.
USPC ............ 717/130; 717/127; 709/201; 719/313

(58) Field of Classification Search
USPC ............... 717/124, 126–128, 130–133, 136, 717/140, 151, 154–158; 709/201, 202; 719/313, 719/315, 317, 319, 328, 330
See application file for complete search history.

(56) References Cited

U.S. PATENT DOCUMENTS

| | | | |
|---|---|---|---|
| 4,819,233 A * | 4/1989 | Delucia et al. | 717/129 |
| 5,146,593 A * | 9/1992 | Brandle et al. | 719/328 |
| 5,506,955 A | 4/1996 | Chen et al. | 395/183.02 |
| 5,522,073 A * | 5/1996 | Courant et al. | 719/313 |
| 5,590,250 A | 12/1996 | Lamping et al. | |
| 5,619,632 A | 4/1997 | Lamping et al. | |
| 5,918,004 A | 6/1999 | Anderson et al. | 395/183.14 |
| 5,956,509 A * | 9/1999 | Kevner | 719/330 |
| 6,026,362 A | 2/2000 | Kim et al. | |
| 6,104,400 A | 8/2000 | Halachmi et al. | |
| 6,105,059 A * | 8/2000 | Al-Karmi et al. | 709/219 |
| 6,126,329 A | 10/2000 | Bennett et al. | 395/704 |

(Continued)

FOREIGN PATENT DOCUMENTS

| | | |
|---|---|---|
| EP | 924615 | 6/1999 |
| JP | 07093182 | 4/1995 |

(Continued)

OTHER PUBLICATIONS

Blumson, Carter, and Hyde, "Automatic Insertion of Performance Instrumentation for Distributed Applications", Feb. 1995, Technical Report, Center for Information Technology Integration, University of Michigan.*

(Continued)

*Primary Examiner* — James D Rutten

(57) ABSTRACT

A monitoring method and apparatus for a component-based software system operating over one or more processing devices are provided according to the invention. The method includes the steps of initiating an invocation of a second software component from within an execution of a first software component. A stub start log data is recorded in an instrumented stub before the invocation of the second software component. A stub end log data is recorded in the instrumented stub after a response is received from the invocation of the second software component. The stub start log data and the stub end log data gather runtime information about execution of the second software component within the component-based software system. The monitoring is capable of gathering log data across a plurality of threads, across a plurality of processes, and across a plurality of processors. The log data may be retrieved and analyzed to produce timing latency information, shared resource usage information, application semantics information, and causality relationship information.

3 Claims, 12 Drawing Sheets

U.S. PATENT DOCUMENTS

| | | | |
|---|---|---|---|
| 6,151,639 A * | 11/2000 | Tucker et al. | 719/316 |
| 6,167,534 A | 12/2000 | Straathof et al. | 714/38 |
| 6,178,382 B1 | 1/2001 | Roederer et al. | |
| 6,256,648 B1 | 7/2001 | Hill et al. | |
| 6,266,805 B1 | 7/2001 | Nwana et al. | |
| 6,282,701 B1 * | 8/2001 | Wygodny et al. | 717/125 |
| 6,311,326 B1 * | 10/2001 | Shagam | 717/128 |
| 6,377,287 B1 | 4/2002 | Hao et al. | |
| 6,487,607 B1 * | 11/2002 | Wollrath et al. | 719/330 |
| 6,499,026 B1 | 12/2002 | Rivette et al. | |
| 6,604,114 B1 | 8/2003 | Toong et al. | |
| 6,775,659 B2 | 8/2004 | Clifton-Bligh | |
| 6,839,897 B2 * | 1/2005 | Takagi | 719/330 |
| 6,897,885 B1 | 5/2005 | Hao et al. | |
| 2002/0083211 A1 * | 6/2002 | Driesner et al. | 709/311 |
| 2002/0087949 A1 * | 7/2002 | Golender et al. | 717/124 |
| 2002/0156767 A1 * | 10/2002 | Costa et al. | 707/1 |
| 2002/0171687 A1 | 11/2002 | Li et al. | |
| 2002/0194580 A1 * | 12/2002 | Ramasamy et al. | 717/130 |

FOREIGN PATENT DOCUMENTS

| | | |
|---|---|---|
| JP | 10214181 | 8/1998 |
| JP | 11272512 | 10/1999 |
| JP | 2000010815 | 1/2000 |
| JP | 2000010939 | 1/2000 |
| JP | 2000330822 | 11/2000 |
| JP | 2001084133 | 3/2001 |

OTHER PUBLICATIONS

Peek, O'Reilly, and Loukides, "Unix Power Tools", Aug. 1997, O'Reilly, ISBN 1-56592-260-3, Section 38.5.*

Harkema et al., "Performance Monitoring of Java Applicatoins", Jul. 2002, ACM, WOSP '02, ISBN 1-1-58113-563-7, pp. 114-127.*

Jacobsen, H.-A.; Kramer, B.J., "A design pattern based approach to generating synchronization adaptors from annotated IDL", Oct. 1998, Proceedings. 13th IEEE International Conference on Automated Software Engineering, pp. 63-72.*

"Statistics Gathering and Analyzing Tool for Open Software Foundation's Distributed Computing Environment", Feb. 1994, IBM Technical Disclosure Bulletin, vol. 37, No. 02B, pp. 215-217.*

"DCE 1.1: Remote Procedure Call", Aug. 1997, The Open Group, Catalog No. C706, Appendix A: pp. 653-660.*

Cantrill, Bryan M., and Doeppner, Thomas W., Jr., 1997, "ThreadMon: A Tool for Monitoring Multithreaded Program Performance," Proceedings of the 30th Hawaii International Conference on System Sciences, pp. 253-265.

Graham, Susan L., et al., 1982, "gprof: a Call Graph Execution Profiler," Proceedings of the SIGPLAN '82 Symposium on Compiler Construction, SIGPLAN Notices, vol. 17, No. 6, pp. 120-126.

Kazi, I.H., et al., 2000, "JaViz: A client/server Java profiling tool," Java Performance, vol. 39, No. 1 (18 pages).

Miller, Barton P., et al., 1995, "The Paradyn Parallel Performance Measurement Tool," IEEE vol. 28, No. 11, pp. 37-46.

Yan, Jerry, et al., 1995, "Performance Measurement, Visualization and Modeling of Parallel and Distributed Programs using the AIMS Toolkit," Software-Practice and Experience, 25(4):429-461.

Yang, Cui-Qing, et al., 1988, "Critical Path Analysis for the Execution of Parallel and Distributed Programs," Prof. Eighth International Conference on Distributed Computing Systems, San Jose, California, pp. 366-373.

ThreadMon: The Tool Itself. On website: www.cs.brown.edu/research/thmon/thmon3.html (4 pages).

Introduction. On website: www.cs.brown.edu/research/thmon/thmonl.html, (2 pages).

Rational Purify for Windows. On website: www.rational.com/products/purify_nt/index/jsp (2 pages).

Rational Purify for Windows: Production Information. On website: www.rational.com/products/purify_nt/prodinfo.jsp (3 pages).

Rational Purify for Windows Whitepapers. On website: www.rational.com/products/purify_nt/whitepapers.jsp (1 page).

Brochure on Rational Purify for Windows, available as a PDF download on website: www.rational.com/products/purify_nt/index.jsp (4 pages).

Rational Quantify for Windows. On website: www.rational.com/products/quantify_nt/index.jsp (2 pages).

Brochure on Rational Quantify for Windows, available as a PDF download on website: www.rational.com/products/quantify_nt/index.jsp (4 pages).

Rational Quantify for Windows NT Whitepapers. On website: www.rational.com/products/quantify_nt/whitepapers.jsp (1 page).

McGregor et al. "Collecting Metrics for CORBA-based Distributed Systems" Software Metrics Symposium 1998 ILos Alamitos, Ca, USA, IEEE Comput. SOC, US Nov. 20, 1998 pp. 11-22.

Grahams S. L. et al: "An Execution Profiler for Modular Programs" XP-000783781 Software Practices and Experience vol. 13 No., 1983 pp. 671-685 1993.

Sridharan B et al: "On Building Non-Instrusive performance instrumentation blocks for CORBA-based distributed systems" Computer Performace and Dependability Symposium, 2000 IPDS 2000 Proceedings. IEEE International Chicageo, IL. USA Mar. 27, 2000 139-143.

Katchabaw M J et al: "Making distributed applications manageable through instrumentation" Software Engineering for Parallel and Distributed Systems, 1997 Proceedings Second International Workshop on Boston, MA USA May 17-18, 1997 pp. 84-94.

"Visualizing the structure of the world wide web in 3d Hyperbolic space"; online; http://graphics/stanford.edu/papers/webviz/htmlnosplit; 11, Munzner et. al.

Bates, P~"Debugging Heterogeneous Distributed Systems using event-based models of behavior"; 1989, ACM Sigplan Notices, vol. 24 Issue 1, 11-22.

Bulatov V~"The HyperProf—hyperbolic profile browser for Java"~webpage~ Jun. 10, 1997 <http://webarchive.org/web/19970610022025/http://www.physics.or; 1-5.

Bulatov, V~"Java Hyperbolic Browser in action!"~ webpage~Jun. 10, 1997 <http://web.archive.org/web/19970610021228/http://www.physics.; 1-2.

Cameron, M et al~"ViMer: a visual debugger for mercury"~ Aug. 2003, Proc. of the 5th ACM SIGPLAN international conf. on Principles and practice of declarit; 56-66.

Graham, S L et al~"An Execution Profiler for Modular Programs"; 983, Software—Practice and Experience, 671-685.

Hao, Ming et al~"Visual Mining Large Web-based Hyperbolic Space Using Hidden Links"~ Jan. 1999~HP Labs~ HPL-1999-20; 1-8.

Hao, Ming et al~"A Java-based Visual Mining Infrastructure and Applications"~1999, IEEE, Information Visualization Proc, Info. Vis' 99; 124-126.

HyperProf(v.1.3)—Java Profile Browser; 1997, http://www.physics.orst.edu/bultav/HyperProf; 1.

Inxight Hyperbolic Tree Server; Inxight Software archived Dec. 12, 2000 Accessed and printed online on Jan. 6, 2006 at http://web.archi; 1-2.

Kazi, I H et al~"Ja Viz: A client/server Java profiling too"~2000, IBM Systems Journal, 39(1): 96-117.

Laio, S et al~"SUIF Explorer: An Interactive an Interprocedural Parallelizer"~7th ACM SIGPLAN Symposium on Principals & Practice of parallel Programming, May 1999; 37-48.

Lamping, John et al~"A Focus+Context Technique Based on Hyperbolic Geometry for Visualizing Large Hierarchies"; May 1995 Proc SIGCHI Conf on Human Factors computing sys; 31 pages.

Loannidis, Y E~"Dyanmic information visualization"; Dec. 1996, ACM SIGMOD Record, vol. 25 Issue 4, 16-20.

Munzner, T~"H3—laying out large directed graphs in 3D hyperbolic space"—Oct. 1997, Information Visualization Proceedings, IEEE Symposium.

Sefika M et al~"Architecture-oriented visualization"; 1996, Proc of the 11th ACM SIGPLAN conf on Object-oriented programming, systems, lanuga; 389-405.

* cited by examiner

US 8,473,922 B2

RUNTIME MONITORING IN COMPONENT-BASED SYSTEMS

FIELD OF THE INVENTION

The present invention relates generally to runtime monitoring in a distributed computer system, and more particularly to runtime monitoring in a component-based distributed system.

BACKGROUND OF THE INVENTION

A key part of software code development is the use of debuggers and profiling tools to understand what a software system is doing. Typically, debuggers (such as Microsoft Visual Studio from Microsoft Corporation or gdb from the Free Software Foundation) are used to diagnose a logic flaw in a program that caused the program to reach an erroneous result. Causal tracing and call stacks, for example, are an essential part of the value derived from program debuggers. Profiling tools (such as gprof (a common Unix tool), Purify (from Rational Corporation), and Quantify (also from Rational Corporation)) are used to capture details about how the program completes its task (for example, how much memory was used, where was most of the time spent in the program, or how system/network resources were used). Statistical analyses of program timing behavior and resource utilization are critical elements of program profiling tools. Thus debugging tools are generally used for checking functional correctness and causal diagnostics while profiling tools are used for checking performance metrics.

Until recently, most programs were written in a programming model known as single-threaded single-process execution (meaning that only one thread of execution ran within an application and the application ran on a single processor). In the mid-1980s, a new class of programs emerged that was known as distributed systems. These systems were notoriously difficult to debug and understand, as they tended to have multiple threads of control and run across multiple processors/computers. The existing debuggers and profilers were not suited to this distributed, multi-threaded programming model.

With the advent of the new class of programs in the 1980s, new tools began to emerge in the area of distributed debuggers and distributed system profilers. These tools can be classified as: application-level-logging tools, binary-rewriting tools, debugger-per-thread tools, network/OS-message-logging tools, and instrumented virtual-machine tools.

Application-level-logging tools were essentially the use of macros embedded in application code that produced printf( ) logs. The principal disadvantage of these tools was that the source code had to be written with logging in mind (i.e., the developer had to consciously add a log at an important event). A variant on the application-level-logging techniques is binary re-writing techniques. Quantify (from Rational Corporation) is a version of a binary-rewriting tool. It re-writes the application code by inserting counting instructions at the basic blocks of the binary program (a basic block is a unit of non-branching code). Quantify does not work on multi-process applications and cannot find causal linkage across processes/threads. The Paradyn tool (from University of Wisconsin—Madison) is a binary rewriting system but has the disadvantage of not being able to automatically filter log messages or track causality between processes (or threads) in the distributed system. The AIMS (Automated Instrumentation and Monitoring System from NASA Ames Research Center) is a source re-writing system that inserts log entry points; however, AIMS also fails to correlate events across threads or to provide causal linkage between processes (i.e., why an event occurred).

Debugger-per-thread tools provide a debugging window per process in the distributed system. There are two key disadvantages to these tools: the first is the screen real-estate taken up in any large scale system, the second is the inability to correlate between processes (i.e., it is not possible to tell what caused one process to enter a particular state or who sent the message).

Network/OS-message-logging tools monitor network traffic by intercepting network packets (and operating system events). Examples of such tools are Sun Microsystem's THREADMON and Hewlett-Packard's DESKTOP MANAGEMENT INTERFACE. These tools are particularly useful for identifying bandwidth issues or amount of CPU consumed by a process. However, these tools have great difficulty turning the network packet (or operating system call) into application meaningful events (i.e., usually one just gets a packet of bytes and no easy way to interpret why the packet of bytes was sent or what the packet is trying to cause to happen).

Finally, in the instrumented virtual machine approach, there are systems like JAVAVIZ (also referred to as JAVIZ, available from the University of Minnesota) for monitoring applications that span multiple Java virtual machines. The principal disadvantage of this approach is that it is tied to the Java Virtual Machine and does not allow intermixing multiple languages or platforms.

For all the above approaches the principal disadvantages are the inability to track causal chains across threads and processes, the intrusiveness of the approach (i.e., requiring changes to the source code), and the inability to track resource utilization (e.g., CPU, memory, bandwidth, time) to application meaningful events.

No existing program development environments are sufficient to debug, monitor, and characterize a multi-threaded, multi-processed, and distributed system.

Therefore, there remains a need in the art for improvements in runtime monitoring of a distributed software application.

SUMMARY OF THE INVENTION

The method employs instrumented stubs and skeletons that are based on an IDL interface of instrumented software applications. The method therefore gathers data at a start of the stub, at an end of the stub, at the start of the skeleton, and at the end of the skeleton. The method also gathers data regarding memory allocation/deallocation and regarding thread creation and destruction. The monitoring method according to the invention is therefore able to create a Global Causal Identifier for a collection of threads that semantically span one or more caller/callee boundaries. This may include the incrementing of a local event number that allows tracking of thread relationships, and further allows an ordering of gathered data in order to track the relationships. Moreover, parent and child relationships are captured for threads by pairing the associated local thread identifiers. The Global Causal Identifier, the Event Numbers, the parent and child thread identifier pairs, and the instrumented stub and skeleton probes are used by the invention to calculate a system-wide causal chain and to compute an end-to-end latency, a CPU utilization, and a total memory usage for a software component executing within a component-based software system.

A monitoring method for a component-based software system operating over one or more processing devices is provided according to one embodiment of the invention. The method comprises the steps of initiating an invocation of a second software component from within an execution of a first software component. A stub start log data is recorded in an instrumented stub before the invocation of the second software component. A stub end log data is recorded in the instrumented stub after a response is received from the invocation of the second software component. The stub start log data and the stub end log data gather runtime information about execution of the second software component within the component-based software system. The monitoring is capable of gathering log data across a plurality of threads, across a plurality of processes, and across a plurality of processors. The log data may be retrieved and analyzed to produce timing latency information, shared resource usage information, application semantics information, and causality relationship information.

DETAILED DESCRIPTION

Definitions

Figure 1:
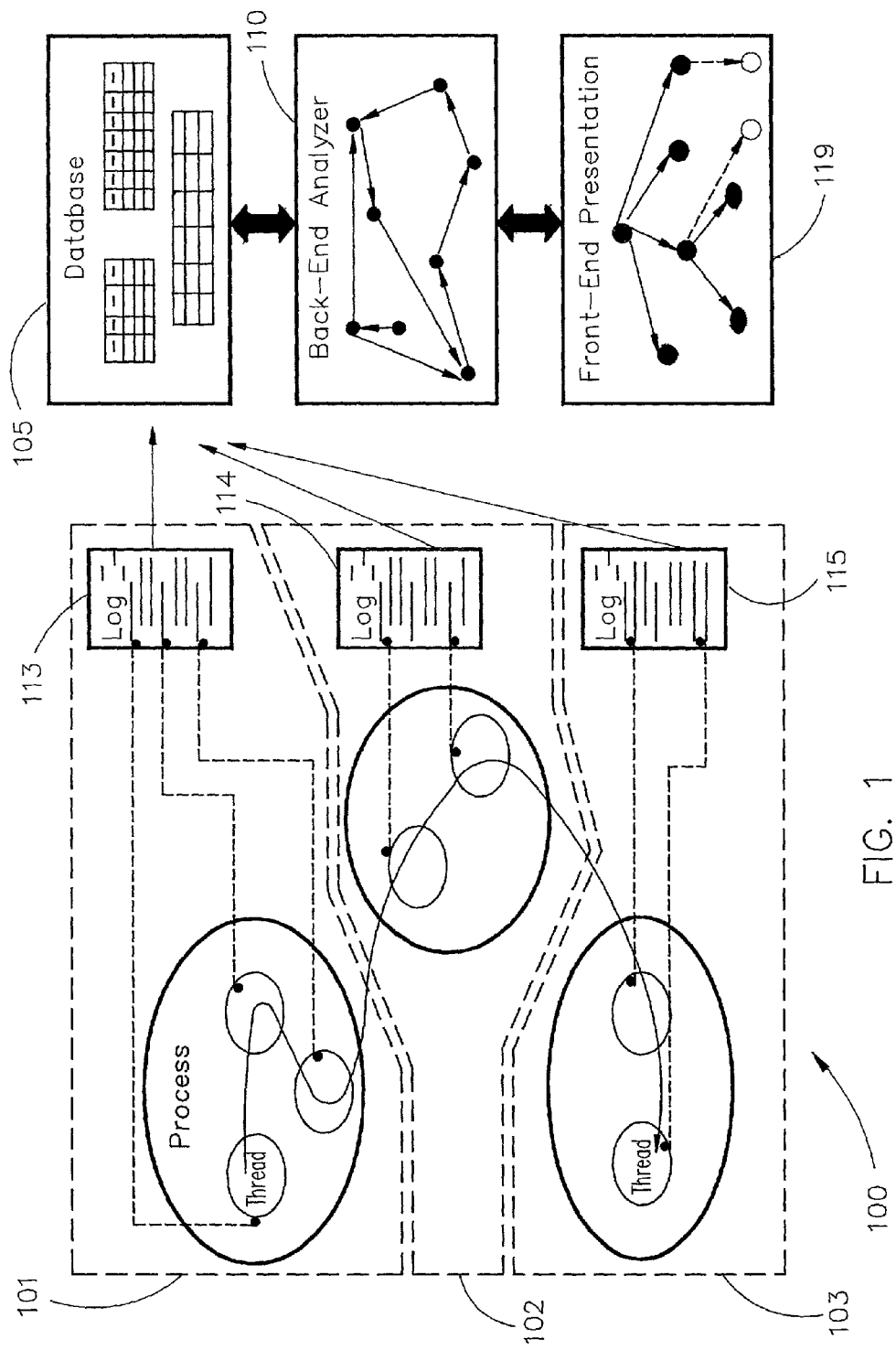
FIG. 1 s a diagram of a distributed computer system according to one embodiment of the invention.

A distributed system is a loose configuration of computers or computer devices that are interconnected by one or more networks or network links. A distributed system may include devices that are remote from each other. The devices on the distributed system may transfer data among themselves and may call and execute applications on other devices. This is especially true of component-based software, in which a software application is composed of components that each perform a specific task and operate according to well defined interfaces.

A component-based software system is a composition of a set of interacting software components, each of which provides and requests service from other software components. Each component has a well-defined interface by which the component exposes its interface to other components. A component's interface, therefore, may be used to provide services to other components and is used by other components to obtain services. In a component-based system, a user-defined software application defines how to implement the components in order to export services, and also defines how to accept and use services provided by other components. If the distributed system is implemented in an object-oriented manner, a software component is created as an object, and such service provision and request is through object method invocation associated with the software components. An application may therefore be created by assembling relevant components.

Component-based systems are built on an underlying remote procedure call model (i.e., invocations on remote components appear as if the invocations were on local libraries or objects). This abstraction layer is accomplished by using a stub object/routine on the caller side and a skeleton object/routine on the callee side. The stub converts an invocation into a message to a remote thread (or process), while the skeleton converts a message into a local invocation on the originally intended component. While the stub and skeletons can be created using many different methods, it is common for these elements to be created from a formal description of a component's interface. This formal description is specified in an Interface Definition Language (IDL). The IDL interface declares a set of operations, exceptions, and attributes. Each operation has a signature which defines at least its name, its parameters, its result, and its exceptions.

An exception is an operational error that occurs during execution of an application (i.e., a runtime execution error). An exception generally indicates that the data processing violated processing parameters in some manner. A typical exception may be an input of a function invocation that does not match specified value range, for example.

A software application may be called and executed over a distributed system. The application may be resident on one computer device and may be called and executed by that device or by other devices on the distributed network. A software application may generate multiple function calls to a plurality of different software components and may process various types of data.

An object is a computational grouping of operations and data into a modular unit. An object is defined by the interface it presents to others, its behavior when operations in its interface are invoked, and its state. An object is typically used to describe how a subsystem in a distributed application performs seamlessly with other subsystems of the same distributed application. The purpose of an object is to enable a distributed application to be designed in an object-oriented manner.

A thread is an independent execution sequence of program code inside a process. Threads are execution entities through which the function invocations are carried. One or more threads are caused by and related to a function call. A thread may spawn other threads, and multiple threads may occur simultaneously on a distributed system.

In this invention, a function is an operation defined in a component IDL specification, i.e., a call across software component boundaries. A function performs a specific data manipulation when executed. For example, a print function may be called and given data to print. The print function may process the data to put it into proper format and may select a specific printer driver. The caller and callee can be co-located in the same process, or can be located in different processes in the distributed system. If the function caller and callee are not co-located in the same process, the corresponding function invocation is referred to as a remote invocation. A software component is composed of a set of functions, each of which has a defined function interface.

Application semantics is a term that describes runtime operating behavior of a software application. Application semantics may include runtime information, such as which function calls which other function, what is the pre-condition and post-condition of a function invocation, why an exception occurs during function execution, etc.

The Common Object Request Broker Architecture (CORBA) is a standard for distributed object communication that was created by the Object Management Group (an open membership, non-profit consortium that provides and maintains computer industry specifications for inter-operable enterprise applications). CORBA is the most widely used distributed object standard for connecting operating system platforms from multiple vendors. The CORBA specification includes an interface definition language (IDL) which is a language-independent way of creating contracts between objects for implementation as distributed applications.

The Remote Method Invocation (RMI) is a mechanism that allows invocation of a method on an object that exists in another address space. The other address space may be on the same computer device or on a different one. The RMI mechanism is an object-oriented mechanism similar to CORBA.

The Microsoft COM/DCOM client (Component Object Model/Distributed Component Object Model) is Microsoft's specification for distributing and using COM objects across systems in the network. The COM/DCOM client may be used to make requests to a server. COM/DCOM clients can be written in visual basic, C++, Perl, or other languages in the WINDOWS environment.

Body of the Description

FIG. 1 is a diagram of a distributed computer system 100 according to one embodiment of the invention. The distributed system 100 is a multi-threaded software system under a monitoring operation. An application executing on the distributed system 100 may be partitioned in multiple processes, located on different machines, and supported by different operating systems (such as Windows NT, HP Unix, VxWorks, etc.). The distributed system 100 includes a plurality of processes such as processes 101, 102, and 103. The various processes are linked by one or more networks or other links. Each process may store runtime information into a log file, such as in the log storage files 113, 114, and 115, for example. Monitoring information is displayed to the user by the front-end presentation interface 119.

One or more computer devices may host and execute a plurality of processes, such as the processes 101, 102 and 103. These processes may be generated by the software application executing within the distributed system 100. Each process may generate one or more threads. In addition, individual processes/threads may generate additional processes/threads. Specific log data is created for each function call invocation.

Figure 2:
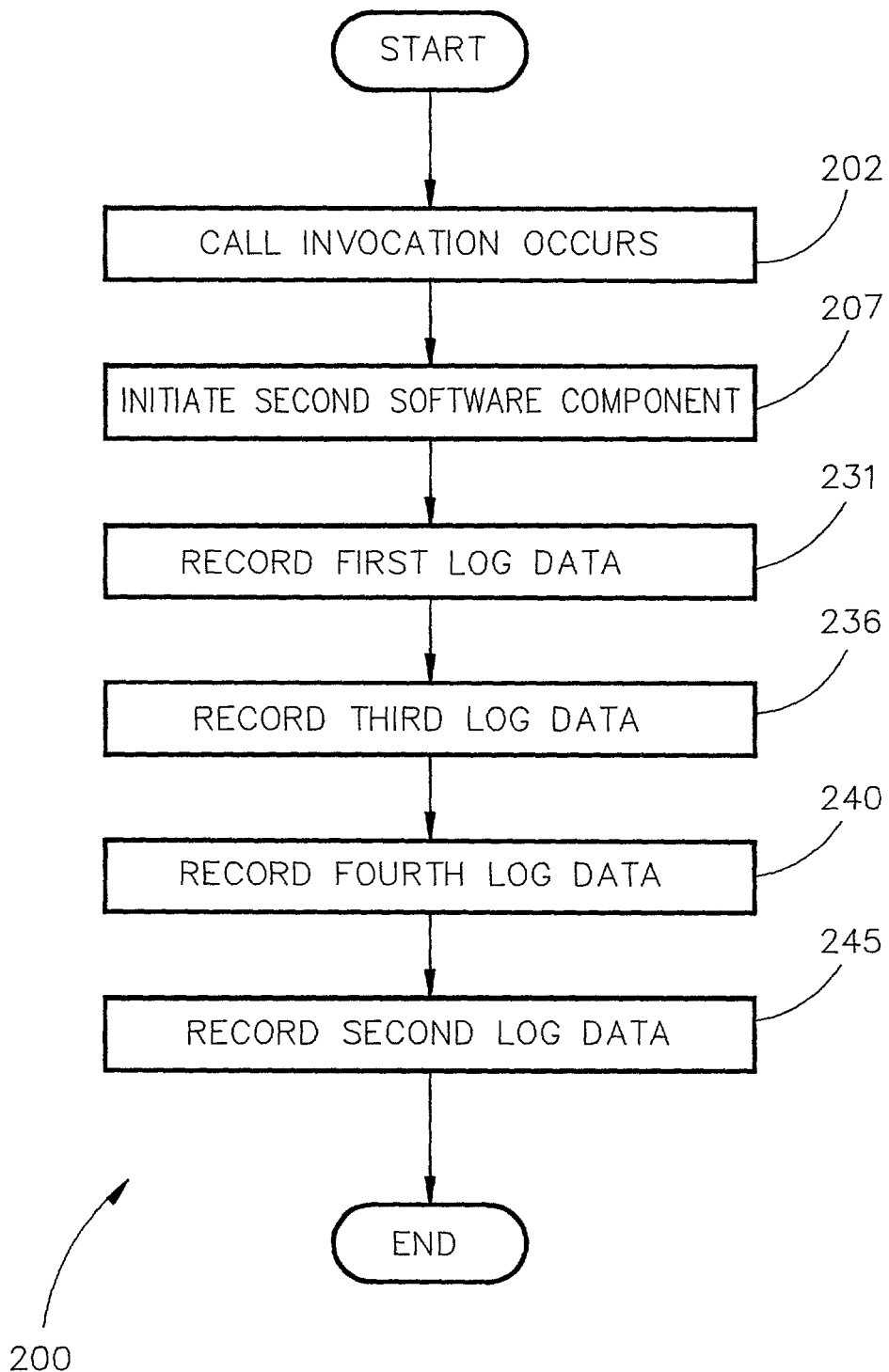
FIG. 2 is a flowchart of a monitoring method according to one embodiment of the invention.

FIG. 2 is a flowchart 200 of a monitoring method according to one embodiment of the invention. In step 202, a software function call invocation (of a first software component) occurs in a monitored application. The monitored application may be any type of object-based software application built using a component technology (such as CORBA, RMI, COM/DCOM, etc.) and running within the distributed system 100.

In step 207, the first software component may initiate a second software component, i.e., a software component executing on the distributed system 100 may call and initiate other software components. Calling may be a sibling-type calling wherein a first software component invokes a function call to the second software component, waits for the function return, and then issues another function call to either the second software component again, or other software components in the system. Alternatively, the call invocation may be a nested call to the child functions, wherein the first software component invokes a function call F to the second software component, which in turn invokes one (or more than one) function call to other software components during the performance of F's execution. In a nested call situation, consequently, the second software component may be invoked, complete (i.e., execute), and return before the first software component completes and returns.

It should be understood that the first software component may not necessarily invoke other software components. However, if subsequent software components are invoked, the monitoring method according to the invention can track and log the causality relationship between components, enabling a complete picture of software component execution within the distributed system 100.

In contrast to logging every function call in a process, a preferred embodiment of the invention instruments the application-meaningful events at the component's IDL description level. In this manner, causal relationships between components can be discerned without undue logging overhead. In another embodiment, other events internal to the component's operational behavior are logged and correlated along with the events logged and correlated at the IDL declared interface layer.

In step 231, a stub start (first) log data is recorded by an instrumented stub. The stub start log data is obtained from a first software probe issued by the instrumented stub (i.e., probe one). The instrumented stub is generated from an IDL interface description of the second software component. This is done so that data may be transported between the first and second software components in a manner that is independent of the underlying infrastructure and independent of the underlying communication protocol. The instrumented stub may be generated during the IDL compilation of the second software component. The stub start log data is recorded before the instrumented stub sends a message to the second software component, i.e., before the instrumented stub invokes the instrumented skeleton. The stub start log data may record several different data types, to be discussed below in conjunction with FIG. 3.

In step 236, a skeleton start (third) log data is recorded by an instrumented skeleton. The skeleton start log data is obtained from a third software probe (i.e., probe three). The instrumented skeleton is likewise generated from an IDL interface description of the second software component (again, see FIG. 3).

In step 240, a skeleton end (fourth) log data is recorded. The skeleton end log data is obtained from a fourth software probe (i.e., probe four). The skeleton end log data is generated by the instrumented skeleton at an execution conclusion of the instrumented skeleton. In this step, the skeleton end log data is recorded at about the time of the execution conclusion and the return to the instrumented stub, which may include a return of a function result to the instrumented stub. The implementation of the function which is invoked from the first software component is contained within the boundaries of the second software component.

In step 245, a stub end (second) log data is recorded by the instrumented stub. The stub end log data is obtained from a second software probe (i.e., probe two). The stub end log data is recorded after a response is received from the second software component.

Although the flowchart 200 depicts the initiation of the second software component as occurring before any data logging, it should be understood that the second software component may alternatively be initiated after the recording of the stub start log data/probe one.

It should be noted that although the figure shows capture and recordation of four log data items, a lesser number may be employed. For example, the monitoring according to the invention may employ only the instrumented stub and may only record the stub start and stub end log data, or even no data logging. This may be done for several reasons, including reduction of amount of logged data and logging scenarios where the causality relationship does not need to be fully captured.

In a preferred embodiment, the log events may log zero or more of the following data types: a timing latency data, an application semantic behavior data, a shared resource usage data, and a causality relationship data. The individual data types will be discussed below in conjunction with FIG. 3.

The monitoring method of the invention advantageously generates an instrumented stub and skeleton from an IDL description. The invention therefore performs monitoring at the IDL/interface layer (i.e., the invention does not record every function call that occurs in the system, but rather only those that occur at component boundaries). In the preferred embodiment, all logs are at the IDL layer. In an alternate embodiment, additional log entries can be added and correlated with the causal events logged at the IDL layer. The invention exploits the IDL layer so that it can log semantically meaningful events (i.e., the IDL function names), log the parameterization for the call (very difficult to do in message-based systems), and can track the causal chain. This has significant benefit over wire-logging mechanisms that log and analyze the lowest level messages sent between processes.

Figure 12:
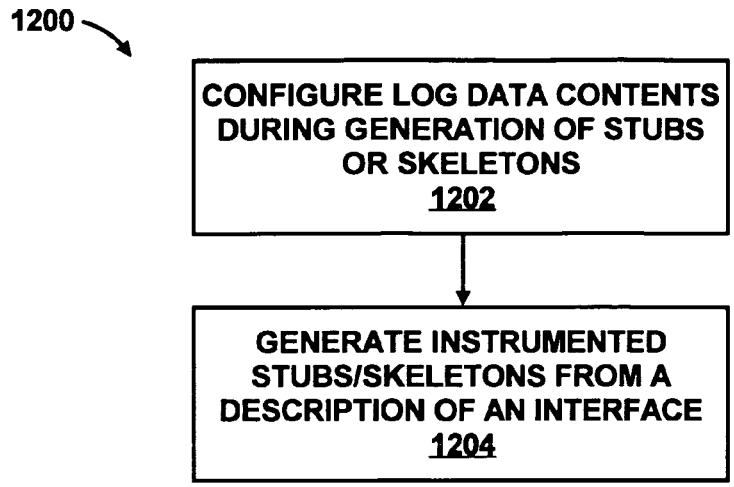
FIG. 12 is a flowchart of a method for generating stubs and skeletons.

With reference to FIG. 12, there is shown a flow chart 1200 of a method for generating instrumented stubs and skeletons. The configuration of log data contents during generation of stubs or skeletons is shown at step 1202. The instrumented stubs and skeletons that are generated from a description of an interface are shown at step 1204.

The data gathering of the invention is in contrast to the monitoring approaches of the prior art, which may be built on intercepting unacknowledged messages or intercepting resource requests (both prior art approaches are open-ended, and cannot track completion of processes or resulting causally-spawned processes). Therefore, unlike the prior art, the invention is able to fully characterize the operations of the software application within the distributed system 100. The instrumented stubs and skeletons perform logging of start and stop events in the stub and skeleton, and therefore capture a beginning and end of a function invocation and execution. This may provide a timing latency data for an individual software component. With the use of an instrumented skeleton, a timing latency for any causally linked software applications and functions may also be captured.

The monitoring is performed only for instrumented software components, although the distributed system 100 may include both instrumented and non-instrumented software components and applications.

In addition, the invention advantageously allows customization of the log data contents. The log data contents may include, for example, an application semantic behavior data, a timing latency data, a shared resource usage data, and a causality relationship data (see text accompanying FIG. 3). The monitoring according to the invention enables customization of the log data contents, and further enables the log data contents of each software probe to be independently selected. Therefore, the log data contents recorded by probe one may be different than the log data contents recorded by probe two, for example. What is more, the individual software of the instrumented stub and the instrumented skeleton may be empty and may generate no log data if desired.

Moreover, a particular instrumented stub may be capable of enabling and disabling a data logging capability of a corresponding instrumented skeleton. This capability enables control over a memory usage data logging and a thread causality data logging.

Figure 13:
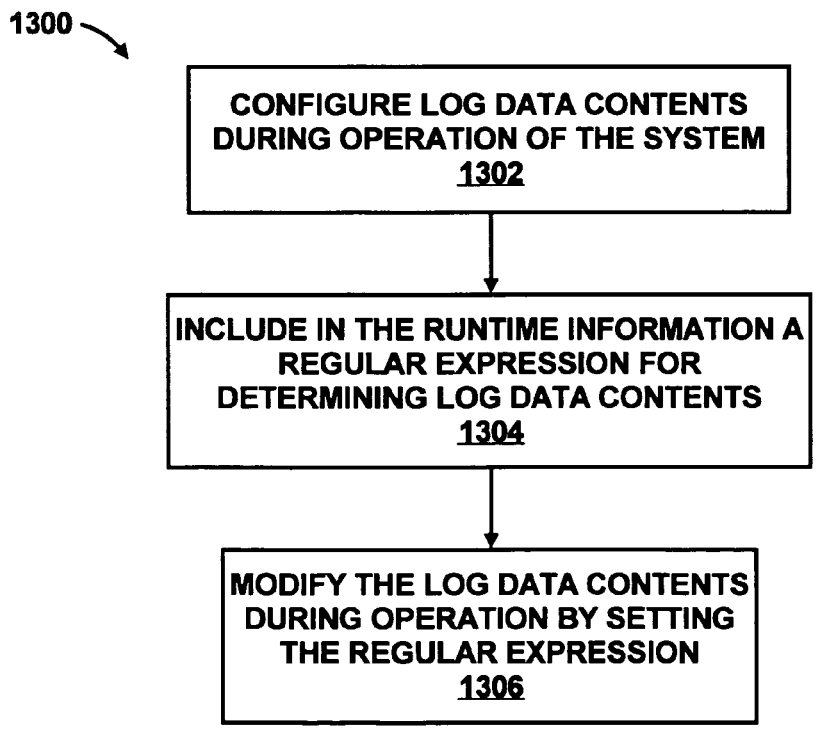
FIG. 13 is a flowchart of a method for configuring log data contents during operation of a distributed system.

The log data contents may be selected/specified during compilation of a particular software application as shown in FIG. 12 at step 1202. In addition, the log data contents may be modified during normal operation of the distributed system 100 as shown in FIG. 13, which shows a flow chart 1300 of a method for configuring log data contents during operation of the system, at step 1302. This may be performed by a regular expression specified by the user, independent of the IDL interface as shown at step 1304. The regular expression may be inserted into a particular software component during compilation, or alternatively may be provided by the user when the monitored system is running. When the regular expression is matched by a variable of event during execution, the log data contents may be changed as shown at step 1306.

As an example, the particular software component may include a regular expression that represents a particular pattern for function call chains. Therefore, if the particular function call chain occurs, the regular expression matches and a deeper logging may be triggered. The deeper logging could comprise modifying a software probe from not only logging a timing latency data and shared resource usage data but to also log an application semantic behavior data and a causality relationship data, for example. Therefore, a minimal data logging may be performed until a predetermined event or events occur, upon which a higher level of logging is initiated.

The method of the invention enables characterization of causality chains initiated by a user-defined software component. This is done by propagating a Global Causal Identifier between the stub and the skeleton, and by using local ordering of stub and skeleton events in combination with an event sequence numbering to give a total ordering over the call chain. Therefore, the log data can be analyzed and sorted to provide individual characterization data for particular causality chains. The characterization data may further include data regarding invocation and execution of each thread. Consequently, the monitoring may capture and characterize threads. Furthermore, the monitoring method achieves a cross-process causal tracing, wherein threads may be traced across processes and over multiple processing devices. Moreover, the monitoring can capture and correlate re-entrant execution of code (i.e., where a single copy of code is simultaneously executed by multiple threads). In addition, the instrumentation may support a local-bypass feature. Local-bypass is an option specified by the user to target the performance improvement that exists when the function caller and the function callee are co-located in the same address space (i.e., within the same process). In a preferred embodiment, all calls are routed through a stub/skeleton pair regardless of whether the target is remote or local. A local bypass optimization is performed (if the target is local) wherein the stub provides all log probes. This can be viewed as equivalent to having an empty skeleton. This may be viewed as a degenerate situation and the callee function invocation is directly performed in the stub. For instrumentation, the original third probe (corresponding to the skeleton start) and the fourth probe (corresponding to the skeleton end) can now be deployed before and after the callee function invocation in the degenerate instrumentation stub.

Another advantage of the invention is that the causality relationships for threads may be captured and characterized without capturing and characterizing the underlying component-based system runtime spawned threads. Therefore, the data logging discriminates between threads generated on behalf of a user-defined software application and threads generated on behalf of the underlying component-based system runtime infrastructure of the distributed system 100. Before passing on a thread for execution to the target operation, a skeleton adds a Marker to the current thread (using the thread specific storage or a global table). If threads are explicitly spawned during the target operation, the Marker will be propagated to the child threads. The Marker therefore indicates whether the thread is an infrastructure thread or an application thread.

In another advantageous feature, the monitoring method is capable of intercepting memory resource usage within the distributed system 100. Therefore, an instrumented stub or skeleton may globally intercept memory allocation and de-allocation requests and log these requests in order to track a dynamic (heap) memory usage. This global memory tracing may be enabled and disabled, and allows tracing across the distributed system 100.

A further unique feature of the monitoring method of the invention is that the causality information, and more generally any instrumentation data, may be passed from an instrumented stub to an instrumented skeleton. This may be done as an additional parameter in a function call. The IDL description therefore may be treated as if the function being monitored has an additional parameter. As a result, an instrumented stub may control the logging of an instrumented skeleton. Moreover, an instrumented stub may enable or disable an instrumented skeleton logging, as previously discussed.

In a further benefit, the individual data logs from the instrumented stub and the instrumented skeleton may be locally buffered and may be accumulated in a persistent storage. The accumulated data may be examined and correlated any time in order to determine behavior characteristics of the distributed system 100 or behavior characteristics of a particular software component within the distributed system 100. Therefore, an ongoing data logging may be later processed, put into an order, and examined in order to capture normal and erroneous behavior within the distributed system 100.

Referring again to FIG. 1, log data is generated during the execution of an instrumented software application and may be directly logged to a log storage file. Each process locally logs the resulting log data in the log storages 113, 114, and 115 (if the process contains software probes). Alternatively, the log data may be buffered to an in-memory, per-process buffer. The buffered data may be transferred to the log storage at some predetermined point in time, such as when the buffer is full or when the process gets terminated. The log storage may be a file system, for example.

The central repository 105 may be any storage device capable of receiving log data over the distributed system 100 and accumulating it, such as a database, for example. A relational database may be employed for the central repository 105, as it facilitates the remote logging capability and also maintains the semantic relationship between different types of data generated from different processes located in different computer devices. The log data from the one or more log storages is transported to and stored in the central repository 105. The transfer may occur at periodic times, may occur upon request by the analyzer 110 or upon request by the central repository 105, or may occur when a local log storage needs to be emptied. The central repository 105 may store data from a plurality of log storages, and is capable of logging a plurality of threads created by various processes in the distributed system 100.

The analyzer 110 may be located anywhere within the distributed system 100 and is not necessarily located on a machine that generates one of the log storages 113, 114, and 115. The analyzer 110 is capable of retrieving log data and manipulating the log data into meaningful results. The log data may be put into a report format, and may be transferred to a remote location, may be displayed to an operator, and may be printed out in a hard copy. The data and results may be displayed at a front-end presentation 119.

The analyzer may include an automatic instrumentation probe inserter (not shown). In order to monitor and characterize the runtime system behavior, the probe inserter may insert software probes into the existing software system's source code implementation to monitor the system and collect necessary monitoring data. Such probe insertion is automatic using current compiler technology.

After the probe inserter statically inserts the probes into the original system, the resulting code implementation is re-linked with some necessary instrumentation libraries. The compilation and linking produce new binary executable images. The executable images are deployed into the distribution system 100 based on a user-defined configuration. When the system is running, the probes produce the associated log data.

Monitoring can be introduced into the distributed system in two flexible ways. First, during the IDL compiler invocation phase, the user may specify which types of probes are included in which components of an application. Alternatively, at the runtime phase, when the distributed system 100 already has the software probes deployed, the user can turn the probes on and off on-the-fly (discussed below in conjunction with FIG. 10 and FIG. 11).

The analyzer may additionally include a monitoring data loader. The software probes produce log data in the threads when the system is running. For a truly distributed software system, the resulting log data can be scattered in different log files located in different machines. The data loader is responsible for collecting all these log data and storing the collected data into the central repository 105.

The analyzer 110 performs several types of system behavior characterization. The system behavior characterization analysis may be presented to a user in the form of a dynamic call graph. A dynamic call graph is a two-dimensional representation of a system-wide execution that shows the components of an application as nodes and shows the interactions between components as lines or arcs. A dynamic call graph therefore is a representation of application execution, and may illustrate the relative execution times, consumed memory, and actual function input/output parameters of application components and their call hierarchy. The dynamic call graph may additionally show the set of function invocations and the set of dynamically spawned application-level threads in the monitored system run, which are causally linked by a function caller/callee relationship and by a thread parent/child relationship.

The analyzer 110 may construct several pieces of information that may be used to understand behavior of a function in the distributed system 100. One is a dynamic call graph that illustrates a function's caller/callee relationship. All function invocations which share an identical Global Causal Identifier (GCID) are ordered based on increasing Event Numbers (each function invocation contains a stub and a skeleton). A dynamic call graph is produced from the ordered, collected log data. This is possible because the ordered function invocation is a language expression whose semantics may be defined by a state machine (described later). The call graph may be produced by consuming the events (i.e., the stub start, the stub end, the skeleton start, and the skeleton end events) one-by-one from the event chain embedded inside the ordered function invocations (similar to a C compiler parsing an input C file and producing an abstract syntax tree).

The thread parent/child relationship (and possibly the transitive of such relationship) can be similarly unveiled through the thread-related log data. By linking the function invocation nodes and thread nodes with function caller/callee relationship log data and thread parent/child relationship log data, a complete dynamic call graph may be constructed for each process executing in the distributed system 100.

The monitoring, according to the invention, is independent of the communication protocol and is independent of the network configuration. The monitoring according to the invention is capable of tracking a plurality of threads, including a plurality of threads generated by a single process. Furthermore, no globally synchronized timers are required. All timing-associated monitoring is based on the timers in each individual computer device, which are not necessarily synchronized.

The distributed system 100 therefore performs monitoring and characterization of the behavior of a multi-threaded and distributed system. The monitoring and characterization is capable of recording application semantic behavior, end-to-end timing latency behavior, and shared resource usage behavior (such as CPU and heap memory usage). The monitoring of the invention enables users to understand how the distributed system 100 behaves and enables the estimation of how the impact of a change propagates through the entire system following semantic causal linkages. In addition, it enables users to specify a resource budget at the system level.

Figure 3:
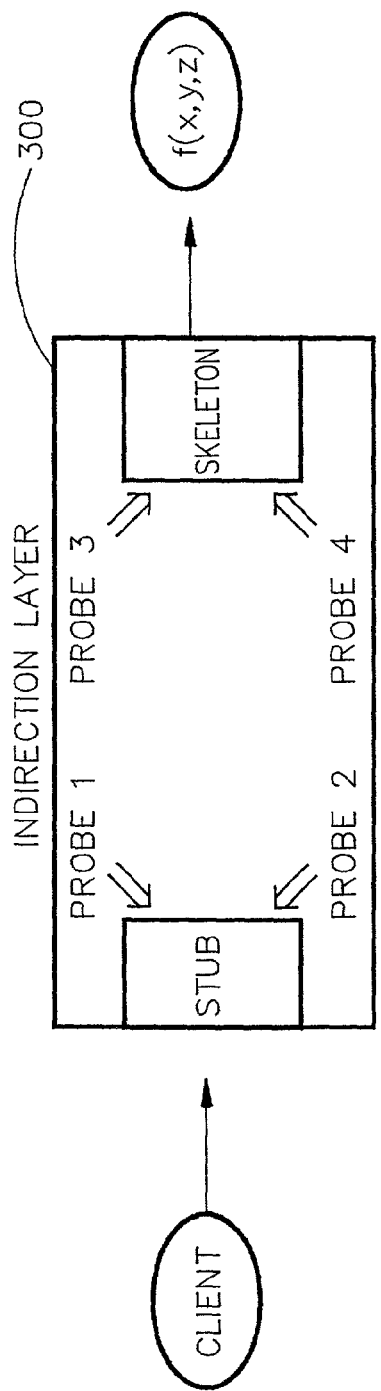
FIG. 3 is a diagram of a stub and skeleton design.

FIG. 3 is a diagram of a stub and skeleton design according to one embodiment of the invention. Component technology, such as CORBA, COM/DCOM, or RMI, creates an indirection layer to separate a function's caller and callee into different threads (or even different processes). The indirection layer comprises two major parts, a stub and a skeleton. During compilation, the stub and skeleton can be automatically generated by an IDL compiler. During normal operation, the stub and skeleton are issued as part of a function call from the client. A component object is accessible to and local to the callee (i.e., it is in the same process). A function implementation f(x,y,z) is defined in the callee component object.

The figure illustrates a function invocation f(x,y,z) in a distributed invocation manner, similar to the local function invocation occurring in a traditional sequential program. The automatic probe insertion mechanism of the invention leverages this auto-generation to produce the software probes located in the stubs and the skeletons. In order to achieve this, the functions which are eligible for monitoring and characterization are the ones whose function interface definition are specified in the IDL as part of the system implementation.

The stub and skeleton 300, according to the invention, include four software probes in the indirection layer. Probe 1 records data upon a function call by the invoking client. Probe 3 records data upon the receipt by the callee object to which the function call is associated. Probe 4 records data by the callee object upon completion of the function call (i.e., upon generation of an output or result associated with the function). Probe 2 records data when the client receives the return of function results (communication between the client and the indirection layer is bi-directional).

Probe location can be specified in different ways. In a default situation, all functions may receive probes. However, users can also selectively specify certain IDL interfaces to be instrumented (each IDL interface contains a set of function interface definitions).

There are four types of monitoring that are accomplished by the invention. Therefore there are four types of log data that are accumulated from the software probes. The four monitoring and log data types are: timing latency monitoring, shared resource usage monitoring, application semantic monitoring, and causality relationship monitoring. Causality relationship monitoring enables the other three types of monitoring data to be linked between different functions and between different threads generated by a distributed application being monitored.

Timing Latency Monitoring

For timing latency monitoring, each probe obtains a time stamp from the local machine when the probe is initiated, and again when the probe is finished. All four probes collect timing latency log data. The difference between the time stamps at the probe two conclusion and the probe one initiation reveals the end-to-end timing latency of the function. The timing latency data may be presented in a tabular form associated with each interface function, or may be directly annotated to an associated dynamic call graph.

As an example, suppose a function "foo" exists in an application. In its implementation, it first invokes a function "times" to query how many times the subsequent invocation of a function "say_it" has to be iterated; then it invokes a second function "what_to_say" to query the string information that the subsequent invocation of the function "say_it" is going to use. It then invokes a function "say_it" for the number of times specified in the function "foo". The associated code is shown in the following example.

```
void Class A::foo( ) {
    ....
    //obj1, obj2, and obj3 are three remote objects identified already.
    int counter = obj1times( );
    String content = obj2->what_to_say( );
    for (int i =0; i<counter; i++) {
        obj3->say_it(content);
    }
    .....
}
String ClassA::what_to_say( ){
    ....
    Thread *thread_1 = new Thread ((Thread_Start_Function)f1);
    Thread *thread_2 = new Thread ((Thread_Start_Function)f2);
    ......
}
```

Suppose that the three invocations of the function "say_it" respectively took 3.2, 3.4 and 3.6 milliseconds to finish, the function "what_to_say" took 4.1 milliseconds to finish, the function "times" took 2.7 milliseconds to finish, and the function "foo" took 20.0 milliseconds to finish. A table for the statistical information (average, standard deviation, minimum and maximum) may be created, to be associated with the function "times", the function "say_it", and the function "what_to_say". As the dynamic call graph is constructed, it can be determined that out of the total 20.0 milliseconds of timing latency, 2.7 milliseconds (14%) is spent on the function "times", 4.1 milliseconds (21%) is spent on the function "what_to_say", and 3.2 milliseconds (16%), 3.4 milliseconds (17%) and 3.6 milliseconds (18%) are spent on each of the three "say_it" function invocations respectively. Note that there is still 14% of elapsed time left over, which is therefore the portion spent on the local computation of the function "foo" itself.

Shared Resource Usage Monitoring

For shared resource usage monitoring, such as CPU usage or heap memory usage, the probes are configured in a manner similar to the configuration of the timing latency monitoring. All four probes collect shared resource usage information when the probe is started and again when the probe is finished.

In terms of CPU and memory usage, different operating systems offer different degrees of accessibility to such usage information retrieval. It is very likely that in some operating systems additional libraries will be required in order to collect and transform information from the underlying operating system.

One type of shared resource is dynamic memory allocation (i.e., heap memory) that is requested by both a user application and by the component-based system runtime infrastructure (which in CORBA is called Object Request Broker, or ORB, for example). This can happen when a library call of "malloc/free" (in C) or "operator new/delete" (in C++) is invoked, for example. A memory management subsystem may be located between the component-based system runtime infrastructure and the operating system. The memory management subsystem may employ an interceptor to intercept each memory request and forward the request down to the operating system (discussed below). Upon receipt of the memory request, the memory management subsystem may gather per-thread memory usage information. This information can be exported to the probes in the stub and skeleton.

One large drawback of current operating systems is that they do not allow heap memory usage information (i.e., dynamic memory allocations) to be directly retrieved. The monitoring of the invention provides such a capability through use of a memory allocation request interceptor.

A memory usage interceptor of the invention is realized by the interceptor functions that are interposed in a memory request operation (the term interceptor herein is not related to any of the CORBA interceptors). An interceptor intercepts dynamic memory allocation and de-allocation requests from both the user-defined application and from the component-based system runtime infrastructure (the requests are directed to the underlying operating system). The interceptor relays the memory requests while also monitoring the corresponding memory transaction. As a result, a per-thread dynamic memory usage statistical information can be collected in the interceptor and be exported to the instrumentation probes located in the instrumented stubs and skeletons.

Dynamic memory allocation/de-allocation is performed through a limited number of pre-defined standard library calls in the respective programming language. In the C programming language, the standard C library functions "malloc" and "calloc" may request a portion of memory from the underlying operating system, and a standard C library function called "free" may request the de-allocation of a portion of memory. In the C++ programming language, in addition to the supported C standard library function calls stated above, an operator "new" may be used to request a portion of memory to accommodate a newly constructed object. The operator "delete" may be used to request the de-allocation of a portion of memory after the requested object has been destroyed.

The interceptor enabling may be accomplished by using a well-known compilation pre-processing technique called macro re-definition. The technique uses a header file in which standard library function calls are re-defined to channel dynamic memory requests through two newly-defined interceptor function calls, such as "PH_malloc" and "PH_free", for example. For the C++ interceptor operators such as "new" and "delete", the C++ language feature called global operator redefinition may be used. With this feature, dynamic memory usage requests through "new" and "delete" are forwarded to the interceptor functions "PH_malloc" and "PH_free". The responsibility of "PH_malloc" and "PH_free" is to collect the per-thread memory usage request information and update a per-thread statistical information. The per-thread statistical information may include, for example, a minimum usage, a maximum usage, and an average usage. The re-defined interception operators (i.e., "PH_malloc" and "PH_free" in this example) forward the memory usage request to the original, non-instrumented C standard library call (i.e., "malloc" and "free").

The interceptor includes a unique capability of identifying where the memory usage request is from, so that memory usage requests from a user-defined software application can be distinguished from memory usage requests from the component-based system runtime infrastructure. This is achieved through library marking. The component technology runtime infrastructure is composed of one or more libraries. One integer is reserved to mark a library or libraries. The marking is conducted by introducing a "marker" parameter in the "PH_malloc" and the "PH_free" function interface, in addition to the normal parameters required for memory allocation and de-allocation. During library construction, all source code files under compilation have to go through a macro re-definition and/or a global operator re-definition process, in which a marker designated to a library or libraries is supplied to each "PH_malloc" or "PH_free" call instance. Similarly, a separate integer is reserved to mark the libraries corresponding to the user-defined application code. With the markers, when the whole application is running, the memory usage interceptor knows where the request comes from and can distinguish between dynamic memory requests from the component-based system runtime infrastructure and dynamic memory requests from a user-defined software application.

Figure 14:
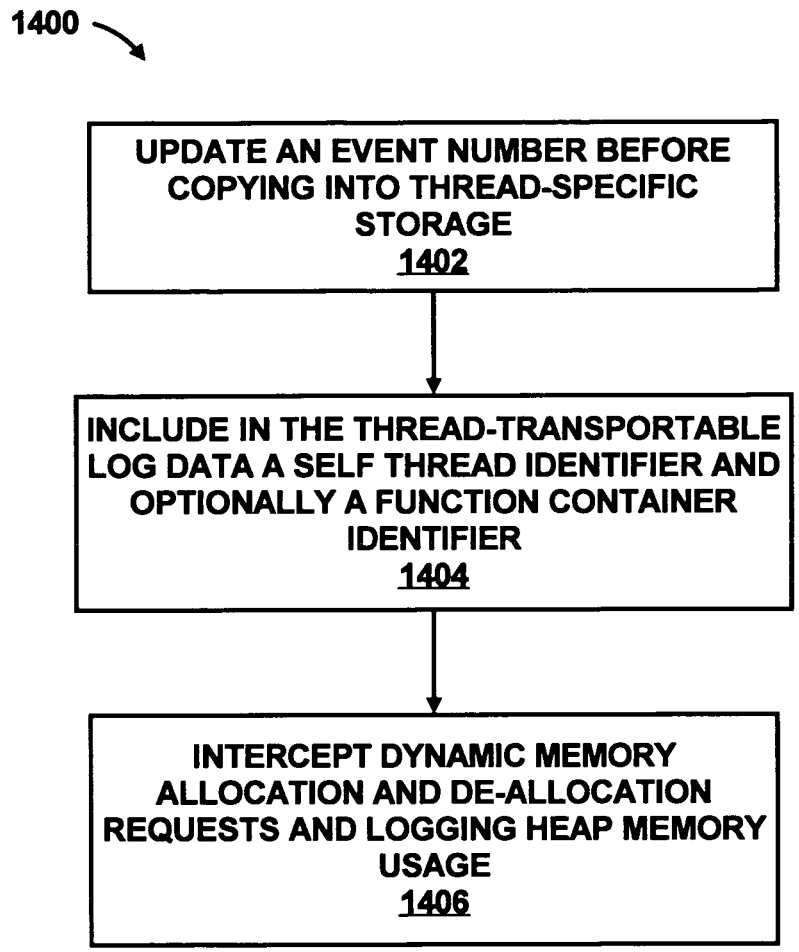
FIG. 14 is a flowchart of a method involved in logging data.

The interception of dynamic memory allocation and de-allocation requests and the logging of heap memory usage is shown in FIG. 14, which shows a flow chart 1400 of a method involved in logging data, at step 1406.

The analyzer 110 may generate a CPU usage report. Unlike a sequential operation where a function execution is conducted in a unique processor, a distributed function call can be spawned through multiple processes and multiple processors. Therefore, the CPU usage may be represented in a vector format <C1, C2, ... CN> where C1 represents the CPU usage of processor P1 and the total number of processors in the system is N.

The CPU consumption may be characterized in different ways. In a first embodiment, the CPU consumption tracks consumption caused only by the individual functions, and does not track any CPU consumption from the semantically linked functions and threads. Therefore, the function consumption is always obtained from two portions, the stub and the skeleton. The stub and skeleton may be executing within the same process or within two different processes (possibly located in two different processing devices).

In a second, more sophisticated embodiment, the CPU consumption is viewed as a propagation activity. Therefore, by following the defined causality relationships (including both function caller/callee relationships and thread parent/child relationships), all of the CPU consumption from the involved child function calls, as well as the dynamically spawned threads in the middle of these function invocations, are charged to the consumption of the function. This may be done because the function is the initiator of the resulting chain of function invocations and spawned threads.

The analyzer 110 may produce a CPU usage report in a tabular representation similar to the one associated with timing latency analysis, or may be annotated to both the thread nodes and the function nodes in the dynamic call graph.

Returning again to the code example given in the timing latency section above, the function "what_to_say" spawns two threads during its function execution (i.e., thread 1 and thread 2). In terms of system configuration, assume that the execution of the function "foo" is performed on Processor A, the function "times" is performed on Processor B, the function "what_to_say" is performed on Processor C (as well as thread 1 and thread 2, which are spawned by the function "what_to_say"), and the function "say_it" is performed on Processor D.

For this example, from a simplistic point of view, assume that only the CPU consumption spent on the function implementation body is taken into account by the analysis. In this example, it is given that by measurement it has been determined that the function "foo" consumes 3.2 milliseconds of processing time on Processor A, the function "times" consumes 2.7 milliseconds of processing time on Processor B, the function "what_to_say" consumes 3.0 milliseconds of processing time on Processor C, and each invocation of the function "say_it" consumes 2.6, 2.6 and 2.6 milliseconds respectively of processing time on Processor D. Thread 1 consumes 1.8 milliseconds of processing time on Processor C and thread 2 consumes 2.2 milliseconds of processing time on Processor C.

Similar to the timing latency characterization, the CPU characterization (average, standard deviation, maximum and minimum CPU consumption) can be determined for each function and represented in a tabular format. In reconstructing a dynamic call graph for the function "what_to_say", the execution of the two spawned threads 1 and 2 should be taken into account. Therefore, the total CPU consumption for the function "what_to_say" should be 3.0 milliseconds (self) plus 1.8 milliseconds (from thread 1) plus 2.2 milliseconds (from thread 2), for a total of 7.0 milliseconds. Likewise, the total CPU consumption for the function "foo" is <3.2, 0,0,0> milliseconds (for the invocation of the function "foo") plus <0, 2.7, 0, 0> milliseconds (from the invocation of the function "times") plus <0, 0, 7.0, 0> milliseconds (from the results for the function "what_to_say", calculated above) plus <0, 0, 0, 2.6> milliseconds (from the first invocation of the function "say_it") plus <0, 0, 0, 2.6> milliseconds (from the second invocation of the function "say_it") plus <0, 0, 0, 2.6> milliseconds (from the third invocation of the function "say_it"), or <3.2, 2.7, 7.0, 7.8> milliseconds, for a total of 20.7 millisecond s. This result indicates that in order to perform the function "foo", the entire distributed system has spent 3.2 milliseconds, 2.7 milliseconds, 7.0 milliseconds, and 7.8 milliseconds on Processors A, B, C, and D respectively on behalf of the function "foo" invocation. It should be noted that without the causality relationship that has been captured by the invention, it would be impossible to identify and measure resource propagation, such as CPU consumption.

If Processor A, B, C, and D are identical, the CPU processing time percentage spent on each function invocation may be calculated. In this example, it can be determined that 15.5% of the processing time is spent on the function "foo", 13.0% is spent on the function "times", 33.8% is spent on the function "what_to_say", and 12.6% is spent on each invocation of the function "say_it".

Application Semantic Monitoring

The application semantic monitoring captures data within a function call, i.e., it captures the function name, the associated interface name, and input/output parameters, function return results, exceptions, etc. Probe one records the function input parameters. Probe two records the function output parameters and function returns, as well as any exceptions that have occurred. Probes three and four do not record any application semantic monitoring data. Only either one of probe one and probe two is required to record the function name and the associated interface name.

Because the analyzer 110 can access all of the application semantic information, timing information, and shared resource log data information stored in the central repository 105, many analyses can be implemented using SQL (Structured Query Language) queries. For example, the analyzer 110 may determine whether specific user-defined exceptions have occurred during execution. If exceptions have occurred, the analyzer 110 may determine the associated functions. For example, the analyzer 110 may determine whether any runtime processes have exceeded a maximum heap memory usage, and the amount of the overage. Furthermore, the analyzer 110 may determine any function invocation instances that reflect such abnormality, including their input/output parameters. Moreover, the analyzer 110 may determine whether a particular input/output parameter associated with a particular function always matches a predetermined predicate, such as "a>0", "a<0", or "a=0", for example. In addition, the analyzer 110 may determine the frequency with which a specific exception is caused by a particular function.

Causality Relationship Monitoring

The monitoring, according to the invention, also captures a causality or relationship tracing that enables monitoring of a function caller/callee relationship, even in multi-threaded applications. The causality relationship tracing also enables a monitoring of a thread parent/child relationship. Because the probes record only local behavior at the stub or the skeleton, such local logging information is useful only when it is causally linked over the whole distributed system 100. In order to accomplish causality relationship tracing, the invention records the following information at all four probes: a Global Causal Identifier (GCID), a Local Function Identifier, an Event, an Event Number, and a Thread Identifier, and a Marker.

The GCID is a Universally Unique Identifier. The uniqueness is over both space and time. During a monitoring operation, the GCID associated with a function F is carried from F's stub to F's skeleton, and carried further down to the functions which are directly or indirectly invoked from F. The Global Causal Identifier (GCID) does not propagate to the child threads which may be spawned in the implementation of F or the functions directly or indirectly invoked from F.

The Local Function Identifier is a serial number that identifies a sequence of stub/skeleton invocations local to each process, and is started from 0 for each individual process.

The Event identifies which probe is occurring, and may be a stub start, a stub end, a skeleton start, or a skeleton end.

The Event Number gives each event a unique number in the function call chain. The Event Number is started from 0 and is sequentially increased for each encountered event (the stub start, the stub end, the skeleton start, and the skeleton end). As a result, the event counter is incremented at each probe in the function call chain.

The Thread Identifier is a unique number assigned to each thread (a child thread will have a Thread Identifier that is different from the Thread Identifier of the parent thread) in a process. The Thread Identifier for each individual process is sequentially increased by a thread constructor in the thread library in order to indicate which logical thread is the computational carrier of this function. The marker is a Boolean label to indicate whether the current function body under execution is from the user-defined application code or not.

The marker of "true" states that the current function is from the user-defined application code, and "false" otherwise.

The above items of information are collected for the purpose of function caller/callee causality relationship derivation. However, in order to infer a thread parent/child relationship, the Thread Identifier alone is not sufficient. In order to keep track of which thread is dynamically created on behalf of which function's execution, the following additional data items are gathered: a Self Thread Identifier, a Parent Thread Identifier, and a Function Container Identifier. These three data items are logged during the execution of the thread constructor in order to record data for each dynamically spawned thread T. The data items generated by these additional logging processes are then separately recorded in a thread table associated with each individual process.

The Self Thread Identifier is a unique serial number in a process. The Self Thread Identifier is generated for each thread being monitored, and is retrieved from the sequentially increased counter (starting from zero) in the thread constructor.

The Parent Thread Identifier is included in a child thread and identifies a parent thread. In a thread table, the Parent Thread Identifier for thread T is the Self Thread Identifier of the thread that dynamically spawned the thread T.

The Function Container Identifier generates a greater-than-zero unique number for a function in a process. It is a copy of the Local Function Identifier of the function F if the thread T is spawned from the function F. The Function Container Identifier is only paid attention to by the skeleton, namely, probe three and probe four. This is because F's implementation is invoked after probe three, and it is the threads that are spawned inside F's implementation that are user-defined and are of interest.

Although the instrumentation probes are primarily allocated in the stubs and skeletons, the thread parent/child causality relationship tracing requires that the above three data items be obtained outside of the previously discussed probes (except the Function Container Identifier). Therefore, the required additional data items are obtained through an instrumented thread library. The thread library provides an abstract interface for thread construction, thread manipulation, and thread coordination. The thread library may also provide other synchronization primitives to the upper layer (i.e., both the component-based system runtime infrastructure and the user-level application), independent of the underlying operating system. By inserting the probes into the thread library, such as the thread constructor, the lifetime span of a thread may be determined. In addition, the resource usage associated with the thread and the parent-child relationship may be determined.

Additional Monitoring

In order to reveal process configuration, namely which function is executed in which process residing in which machine, the invention independently records the following process information: a Host Name, a Process ID, and a Process Universally Unique Identifier (Process UUID). The Host Name is the name of the machine or computer device where the process is located. The Process ID identifies a unique serial number with respect to the host machine where the process is located, and is typically assigned by the operating system. The Process Identifier is unique in each individual machine during the system run. The Process UUID is a universal identifier for a process across the Internet. Such process-wide logging information is logged separately from the log data associated with each individual probe.

Figure 4:
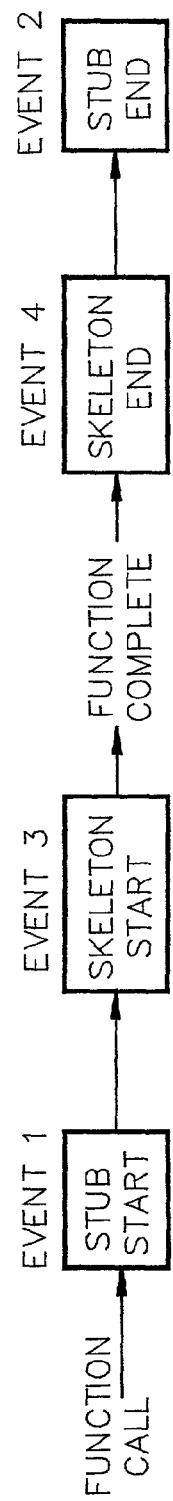
FIG. 4 shows the chronological steps of a monitoring process for a single thread.

FIG. 4 shows the chronological steps of a monitoring process for a single function invocation, with event one being the stub start, event three being the skeleton start, event four being the skeleton end, and event two being the stub end. Events one and three occur after the function invocation and before the function completion. Events four and two occur after the function completion. The figure therefore shows the sequence of stub and skeleton activation of a single function call.

The four events occur within an invocation and execution of the function associated with a second software component. A second software component may be invoked from within the first software component, with the invocation of the second software component potentially occurring at any point in time in relation to the four events shown.

Figure 5:
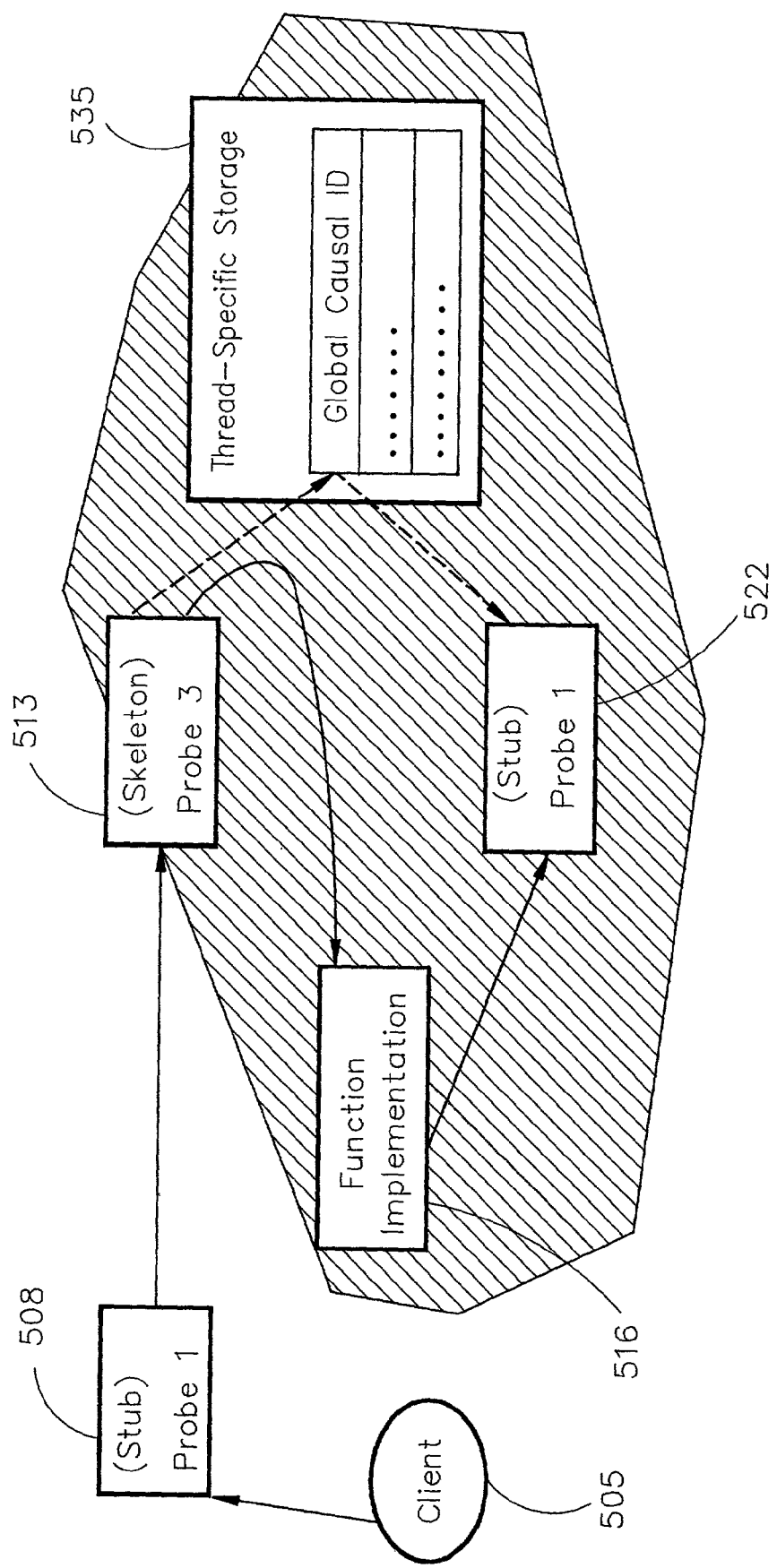
FIG. 5 is a process diagram of a relationship transportation for causality tracing.

FIG. 5 is a process diagram of a function caller/callee relationship transportation for causality tracing according to another embodiment of the invention. The client 505, which may be any component-based software application issuing a function call, generates a stub start probe one 508, which passes a portion of function call log data to skeleton start probe three 513, along with the normal function call data. This portion of function call log data is called function-transportable log data. The function-transportable log data may include the Global Causal Identifier (GCID) and the Event Number. The passing is done through the communication channel between the stub (probe one 508) and the skeleton (probe three 513).

Although the arrows in the figure indicate data transport in one direction only, it should be understood that data may also be transported in a reverse direction as the function returns. For example, probe four (not shown in this figure) corresponds to probe three 513. Probe four will transport back the updated function-transportable log data to probe two (not shown in this figure) along with the function return parameter (probe two corresponds to probe one 508).

The actual data transportation is accomplished by an additional transport parameter that is added virtually to the IDL interface. This transport parameter is passed between an instrumented stub and an instrumented skeleton. This is done without changing user-defined application code. This transportation may be done to avoid modifying the user-defined code associated with the function implementation 516. Therefore, by combining the private communication channel (used by the component system runtime infrastructure to transport normal function data between the stub and the skeleton), and the thread-specific storage 535 to bridge such private and possibly different communication channels, the function call log data (such as a Global Causal Identifier) may be seamlessly transported along the full function call chain.

The data transport between a stub and a skeleton may be done in order to accomplish a function caller/callee relationship tracing through a function-transportable log data. This may include transport of the Global Causal Identifier (GCID) and the Event Number of probe one 508.

Inside the function implementation 516, another function call may be invoked, such that a child function probe one 522 is generated. Since the function implementation 516 and the child probe one 522 are always located in the same thread, the further transportation of a portion of the function call log data (i.e., the skeleton start log data) from probe three 513 to child probe one 522 is performed through a shared storage mechanism. This portion of function call log data is called thread-transportable log data. The shared storage mechanism may be implemented by a thread-specific storage 535. After the transported portion of the function call log data (i.e., function-transportable log data) is received by probe three 513, at least a portion of this skeleton start log data is stored in the thread-specific storage 535, and may be later retrieved by the child function's probe one 522. The at least a portion of the skeleton start log data may be updated before it is stored in the thread-specific storage 535. This may include incrementing an Event Number before storage.

The child function probe 522 retrieves the log data from the thread-specific storage 535, updates it, and then repeats the transportation process starting from the instrumented stub to the instrumented skeleton (described above), as function control keeps propagating along the function call chain.

Figure 6:
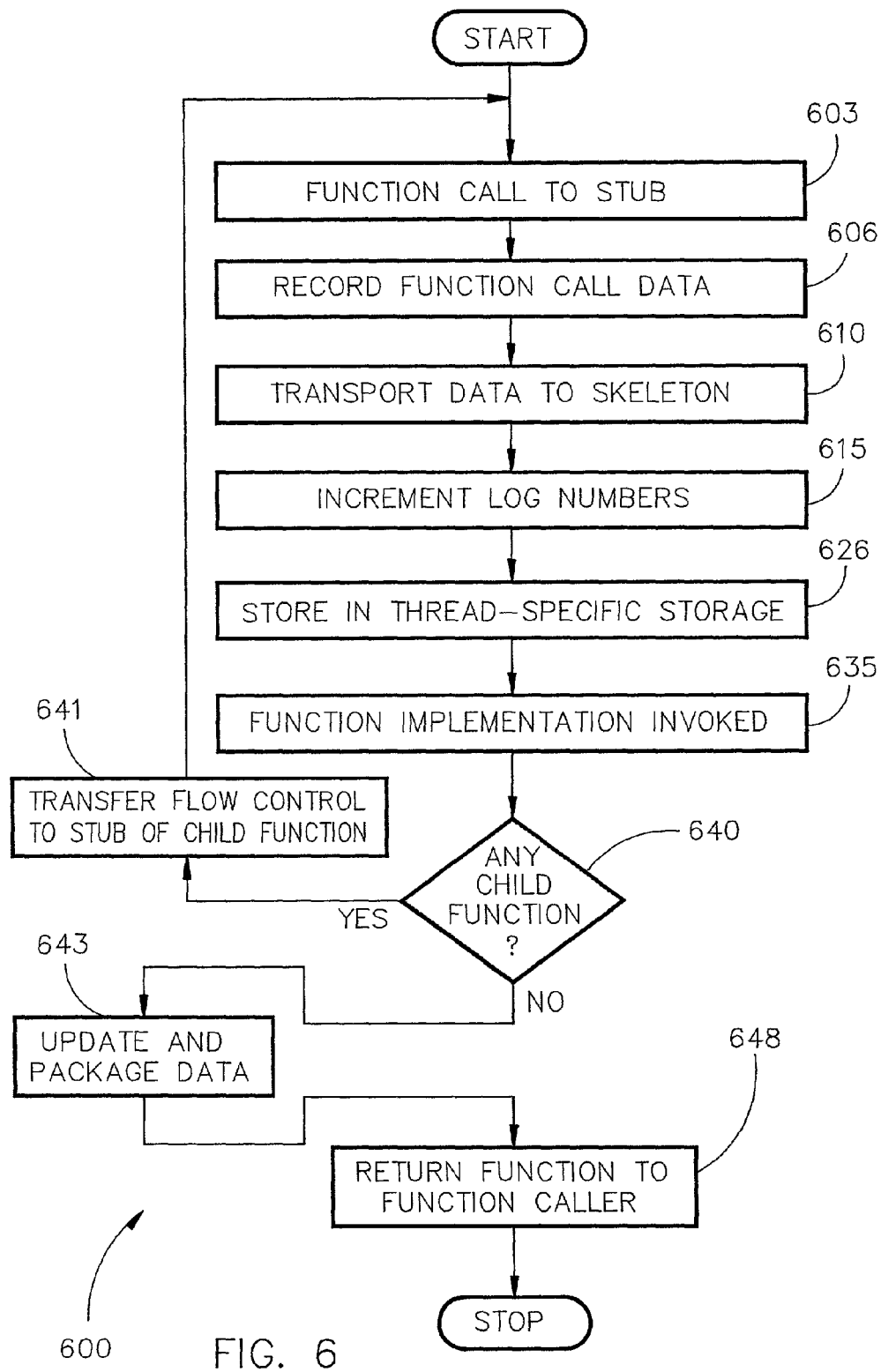
FIG. 6 is a flowchart of an execution sequence method for tracking a function caller/callee relationship.

FIG. 6 is a flowchart 600 of an execution sequence method for tracking a function caller/callee relationship. The flowchart 600 shows an execution sequence that fulfills a seamless function call log data transportation such as that shown in FIG. 5. In step 603, a function call to a stub occurs.

In step 606, probe one is issued and the function call data is recorded, as previously discussed.

In step 610, a particular portion of log data is transported from the stub to the skeleton, i.e., from probe one to probe three (namely, function-transportable log data). The log data therefore is transported along with the normal function call data.

In step 615, specific log numbers may be incremented to reflect the current probe and event. For example, the Event Number from the function-transportable log data will be incremented in each issued probe. In addition, the Local Function Identifier and the Thread Identifier may change.

The update of an event number before copying into thread-specific storage is shown in FIG. 14 at step 1402.

In step 626, the updated function-transportable log data transported from probe one 508 to probe three 513 is also stored in thread-specific storage 535, as previously discussed.

In step 635, the function implementation is invoked, i.e., the function receives data and starts executing.

In step 640 it is determined whether there is any child function invocation within the current function implementation. If not, the method proceeds to step 643; otherwise, it branches to step 641.

In step 641, flow control is transferred to the stub of the child function, and the method branches back to step 603 in order to process the child function.

In step 643, the function-transportable log data is updated and packaged in probe four for transport. The updating may include incrementing the Event Number. The packaging may include adding communication-neutral transport data or converting the function-transportable log data into a communication-neutral format. When the function-transportable log data is received by probe two in the instrumented stub (along with any function invocation response from the skeleton), probe two conducts any necessary further updating. Probe two then stores the updated information into it's thread-specific storage, to be ready for the subsequent function invocation's further causality tracing.

In step 648, since there is no child function invoked, the flow control of the function returns to the function caller. Note that if a function call implementation contains multiple cascading child function calls in its implementation body, the above-mentioned transportable log data is still transportable between such child function calls by using the above private communication channel and thread specific storage mechanism. As a result, at least some data may be required to be updated and packaged for transport.

Therefore, the method uses a thread-specific storage to bridge the log function data-passing activity defined in step 610. Together, a seamless log data transportation mechanism is formed. In addition, the figure shows how the log numbers, such as the Event Number, etc., are incremented during the monitoring process in order to trace all aspects of the function call chain.

Figure 7:
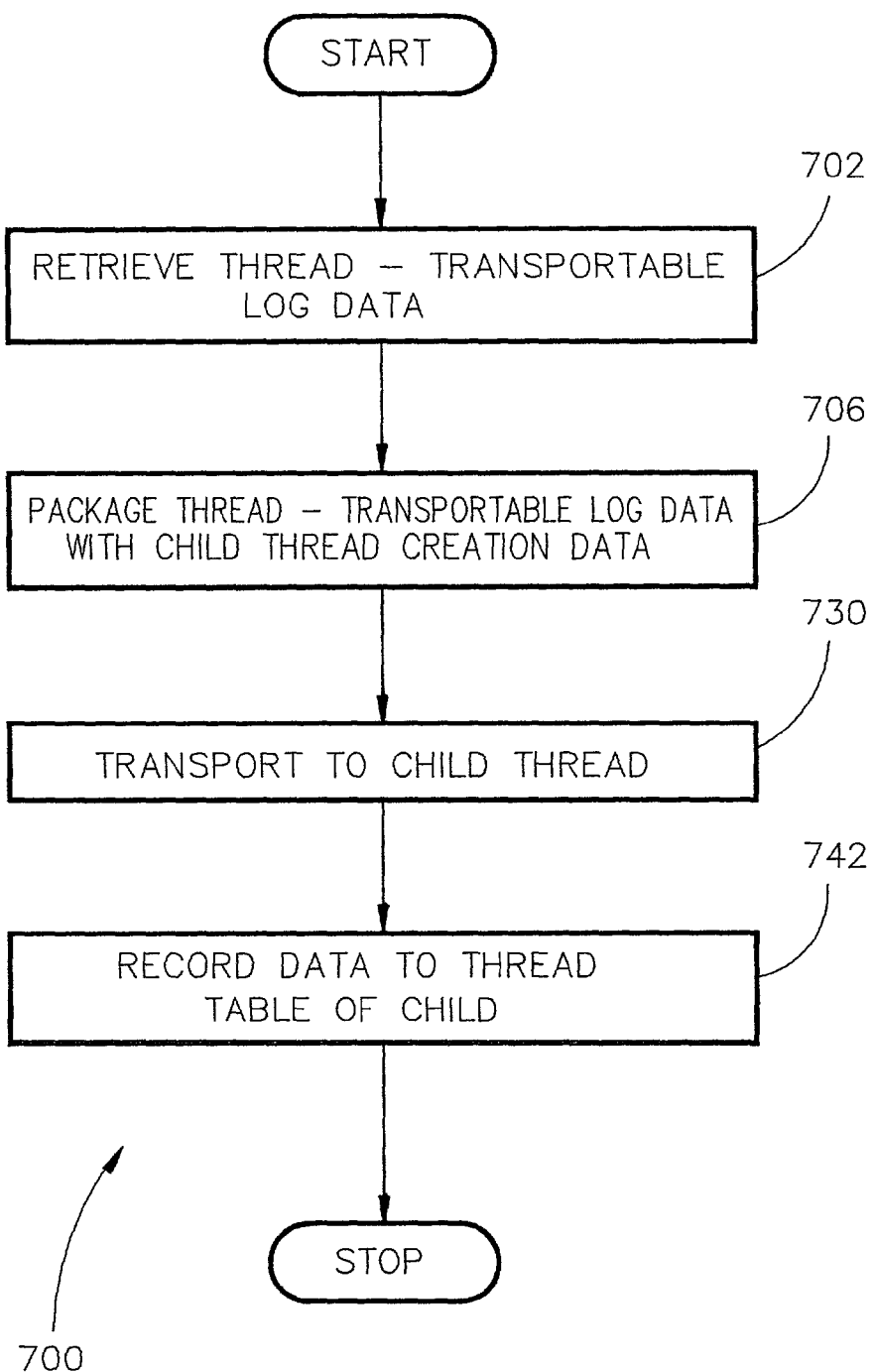
FIG. 7 is a flowchart of a method for transporting log data from a parent thread to a child thread.

FIG. 7 is a flowchart 700 of a method for transporting log data from a parent thread to a child thread according to one embodiment of the invention. This may be done in order to trace a thread parent/child relationship. In step 702, thread-transportable log data from a parent thread is retrieved from a thread-specific storage. The thread-transportable parent log data is typically generated by probe three during the function call, and may include the Thread Identifier, the Local Function Identifier, and a Marker. The Marker may be used to distinguish a user-application-spawned thread from a thread spawned directly by the underlying component-based system runtime of the distributed system 100. The Marker may be excluded if the Thread Identifier is capable of providing the distinguishability, or if system threads are desired to be logged and characterized. It is assumed that the child thread is created with some passed (original) function parameters from the parent thread.

In step 706, the thread-transportable log data is packaged with the actual function parameters of the function which will be the entry point of the newly created thread.

The inclusion in the thread-transportable log data of a self thread identifier and optionally a function container identifier is shown in FIG. 14 at step 1404.

In step 730, the parent thread packaged data is transported to the child thread when the child thread is created by the operating system. This transportation is fulfilled by the operating system.

In step 742, the transported data is recorded to a thread table of the child thread along with the thread information associated with the current child thread. This may include unpackaging the transported data. In addition, applicable log values may be updated, such as the process wide sequence number associated with thread identifiers, etc.

Two types of composition relationships exist in multi-threaded applications: a thread can be invoked during function execution (i.e., a thread-invoke-function relationship), and a thread can be spawned during a function execution (i.e., a function-spawn-thread relationship). The monitoring of these two types of relationship is a by-product of the function caller/callee and the parent/child thread determinations. The reconstruction of these two types of cross-linking relationships is performed by using logged data. If function F1 spawned thread T6, then thread T6's Function Container Identifier will be identical to function F1's Local Function Identifier. It can be determined that thread T1 invoked function F9 if T1's Self Thread Identifier is identical to function F9's Thread Identifier.

In contrast to the function caller/callee relationship determination, the thread relationship reconstruction is relatively straightforward. A thread TI is a parent to thread T2 if thread T1's Self Thread Identifier is identical to the Parent Thread Identifier of thread T2.

Figure 8:
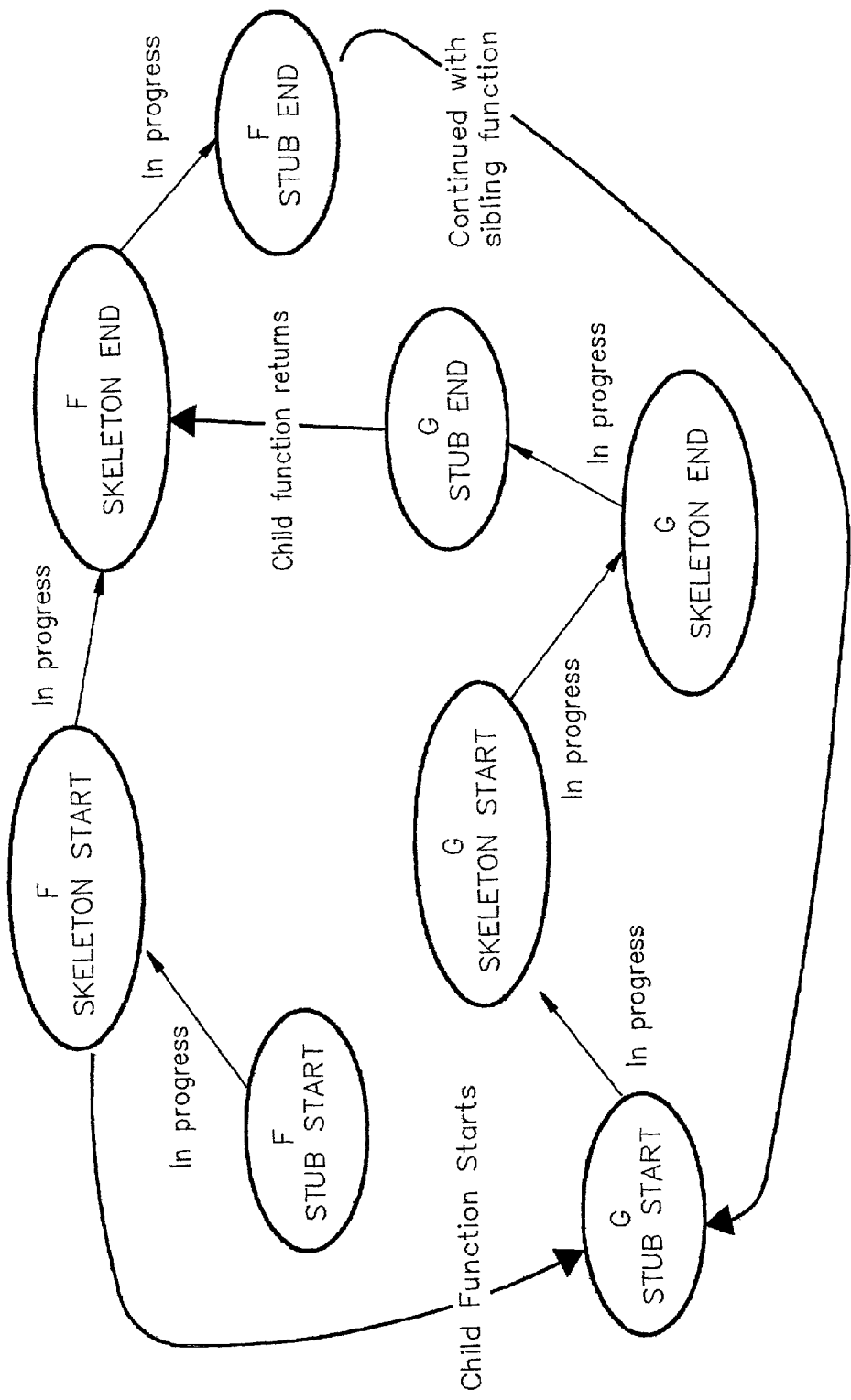
FIG. 8 is a state transition diagram that illustrates a function caller/callee relationship determination.

FIG. 8 is a state transition diagram that illustrates a function caller/callee relationship determination. The figure illustrates how the analyzer 110 may differentiate between a parent/child relationship (caused by nesting of function calls) and a sibling relationship (caused by cascading function calls). In preliminary steps (not shown), a set F' of unique Global Causal Identifiers are identified (in the log storage 105). If the set F' contains data, a specific Global Causal Identifier xy is used to retrieve all applicable function log records. The retrieved function log records are sorted into an ascending Event Number order.

The analyzer 110 scans through the sorted array of function log records and identifies the states associated with the log records. Each state is represented by the function name, by the stub or the skeleton, and by the start/end Event.

A transition from one state to another may be used to generate a parsing decision. A decision of "in progress" between two states indicates that the two adjacent log records come from the normal execution of a function call, whose execution sequence is defined in FIG. 4. A decision of "child function starts" indicates that subsequent log records come from a child function of the current log record function. A decision of "child function returns" indicates that subsequent log records come from a parent function of the current log record. A decision of "continued with sibling function" indicates that the next log record comes from a function immediately following the return of the function associated with the current log record.

In a function call implementation, there exist two general function call patterns. A first pattern is a sibling function relationship. In a sibling relationship, function F may call multiple other functions G1, G2, in a cascading manner. The functions G1, G2, etc., are called sequentially by function F in order to implement function F (i.e., function F calls function G1, and after function G1 completes and returns then function F calls function G2). This function call chain of G1, G2, etc., forms a sibling function relationship. This first pattern is solely determined by the "continued with sibling function" event.

The second pattern is a parent-child function relationship. In a parent-child function relationship, function F calls function G and function G subsequently calls function H. Function G does not complete and return until after function H completes and returns. The function calls therefore are said to be nested. This second pattern is determined by the "child function starts" and the "child function returns" events.

The figure only shows how to determine the function caller/callee relationship when there is no runtime execution failure in the system, such as a crash. There may be an additional "abnormal" transition state (not shown) that is called if the two adjacent log function records do not follow any of the transition patterns shown in the state transition diagram. If that happens, the analysis will indicate the failure and the analysis is restarted from the next log record.

Figure 9:
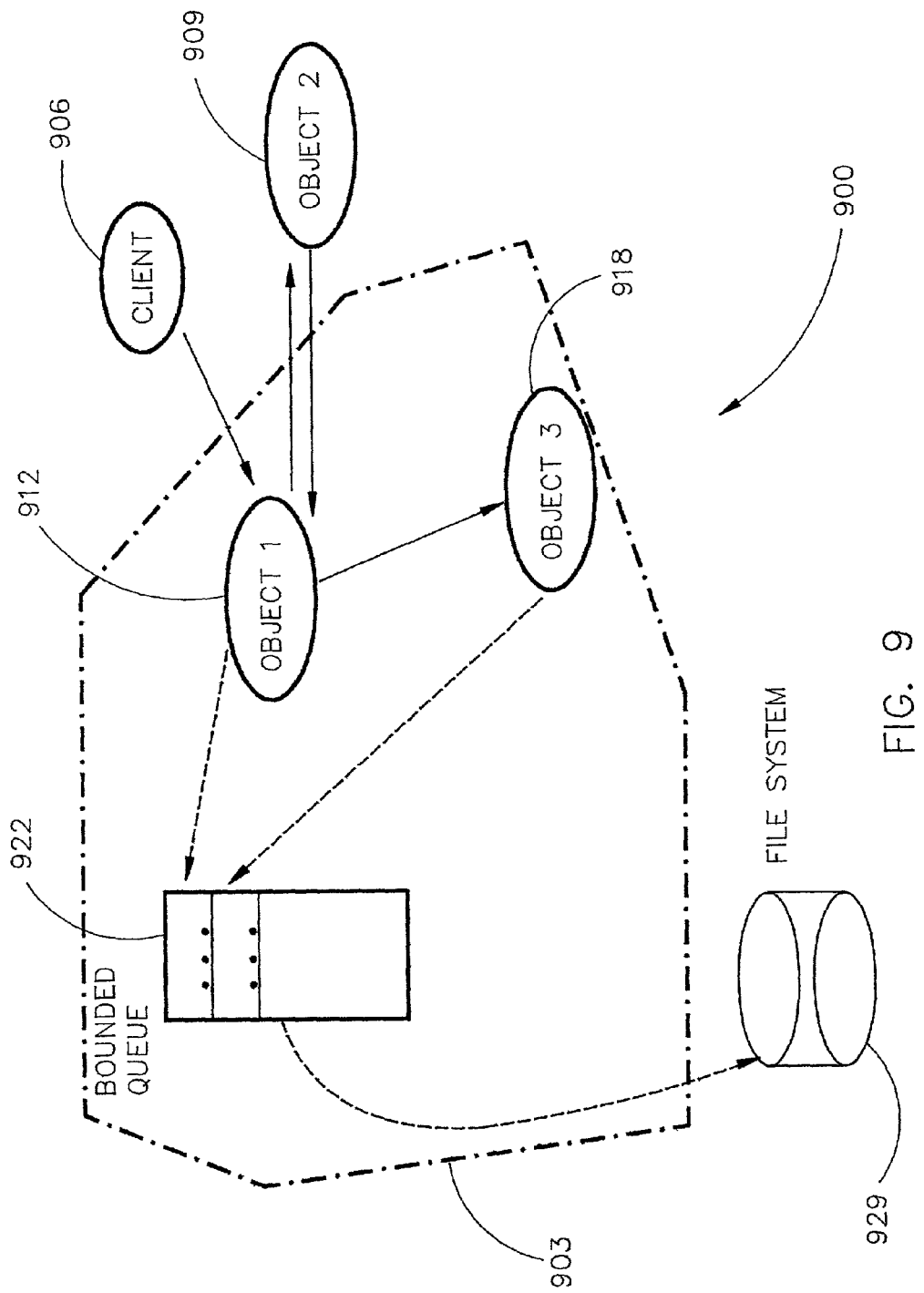
FIG. 9 is a process diagram of data accumulation and storage.

FIG. 9 is a process diagram of data accumulation and storage according to one embodiment of the invention. The figure therefore illustrates how the log data may be accumulated locally. Each log file is associated with a process. In process 903, a client 906 (i.e., an application) invokes a function call F associated with a first object 912. The first object 912 may further invoke a call associated with a second object 909, which may be outside the process 903 but yet inside function F's implementation (i.e., a child function is invoked). Either one or both objects may further invoke method (function) calls associated with a third object 918. The log data from object 912 and 918's function invocation is first transported to a log storage 922, such as an in-memory bounded queue, for example, where it is temporarily stored. Since the second object 909 is located in a process separate from process 903 (which includes the first object 912 and the third object 918), the log storage 922 receives log data from only the first object 912 and the third object 918, and not for the second object 909.

The data logging may be performed as a per-process action. When a system run is finished, the contents of the local log 922 may be flushed to a file system 929 for long-term storage. The flushing may occur when the log storage 922 is full or when the application (which is initiated by the client 906) is terminated. The files may be transferred to a particular directory in a particular machine through a data transportation protocol such as FTP, for example. From there, the log data may be stored to a remote database through a database access protocol such as JDBC (suitable for Java implementation) or ODBC (suitable for C++ implementation).

Because the log data is scattered in different processes located in different machines, a data provider and a data collector are not necessarily running on identical machine platforms. As a result, the log data should be presented in a machine-neutral format. For example, the log data generated in a first machine should be able to be reconstructed in a second machine. Since such data neutrality is known in the art, it may be employed to package and transport data in a binary and neutral format.

The data storing process may include the following steps. First, the data structure associated with the log data is defined in the IDL specification. Second, the IDL compiler may be run to produce a set of classes which have methods to marshal and de-marshal the log data. A marshalable object is an object that can be converted to other formats and otherwise processed for transfer. Third, when the in-memory buffer is full, the stored log data may be converted into marshalable objects. Marshalable refers to the ability to convert the data to other transient formats, such that the object information can be sent/received through the Internet or a file system in a binary and neutral manner without information distortion. The original object can be subsequently reconstructed from the transient format. Fourth, by invoking the marshaling method of a converted object, the log data may be processed and handled in a neutral binary format. Such binary data may be stored into the central repository 105. Fifth, when the log data file is fetched to a central data collector, the de-marshaling associated with the converted objects may then be invoked and the original objects re-constructed.

The central repository 105 is the final log data storage site. In a database embodiment of the central repository 105, the database may be advantageously used to structure the log data from different processes located in different computer devices. This may be done in the database by following different types of semantic relationships. In addition, a SQL database language may be used for data manipulation and analysis. The SQL database language may provide a generic and efficient API (Application Program Interface) to retrieve and manipulate the stored log data both at a system characterization phase, and at an end-analysis result presentation phase.

Figure 10:
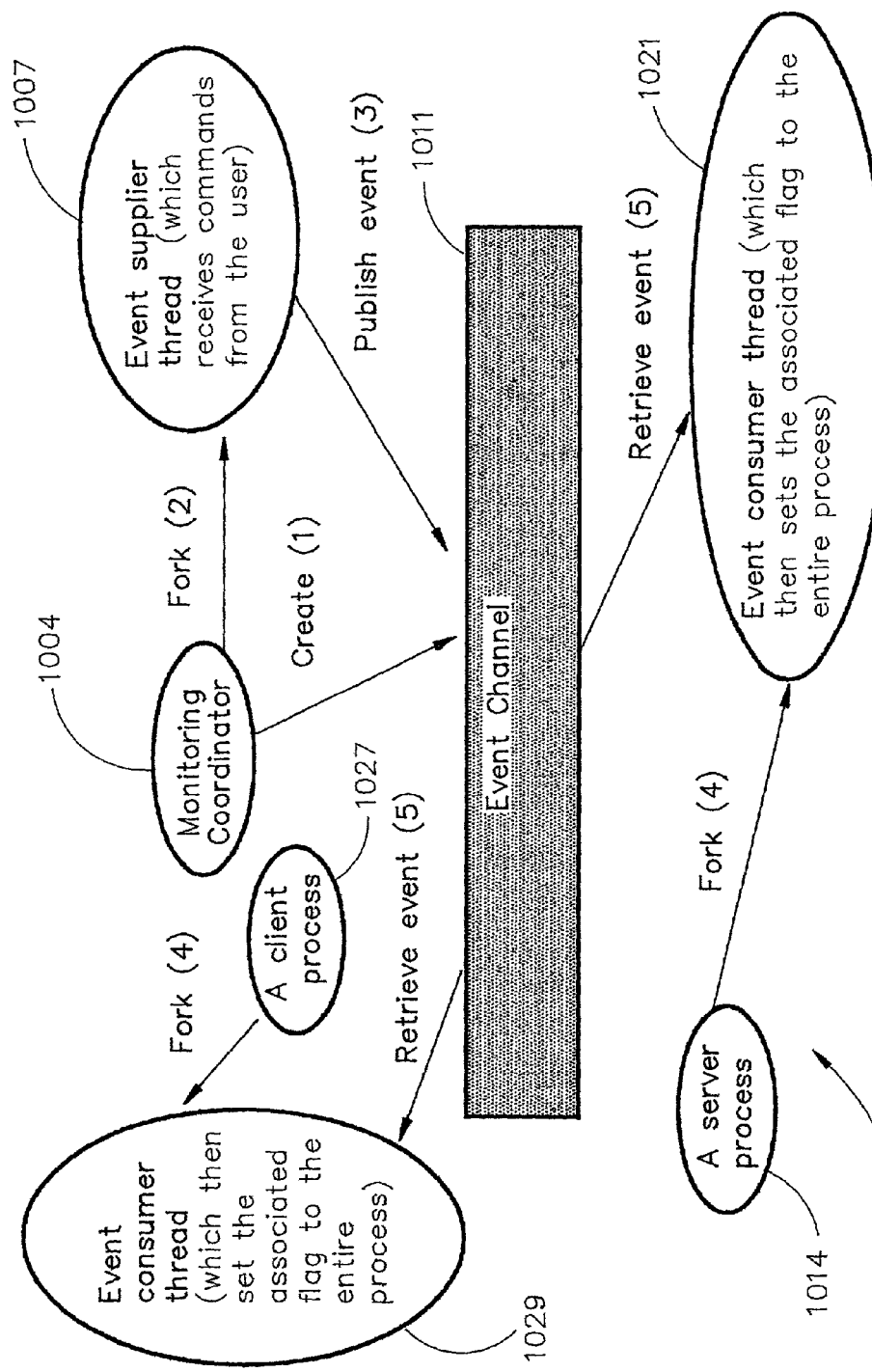
FIG. 10 is a process diagram of a monitoring embodiment for a selective monitoring framework, wherein minimal data logging may be done in order to reduce the amount of gathered data.

FIG. 10 is a process diagram 1000 of a monitoring embodiment for a selective monitoring framework, wherein minimal data logging may be done in order to reduce the amount of gathered data. System monitoring using a fixed configuration of probes may gather a significant amount of log data. This may impact the performance and behavior of the system under monitoring. Furthermore, concurrent monitoring probes can potentially interfere with each other, and therefore affect the accuracy of the monitoring result. For instance, application semantic monitoring probes unavoidably introduce monitoring overhead to both CPU and timing latency monitoring. Therefore, it may be desirable to reduce the data produced by the probes to only the portion which is significant to an underlying monitoring. Additionally, the monitoring may be further streamlined by allowing probes to be dynamically enabled or disabled, based on the monitoring being performed.

The monitoring process 1000 includes a monitoring coordinator 1004 that is started before any user (client) and server processes are created, and is always running. The monitoring coordinator 1004 creates an event channel 1011. The monitoring coordinator 1004 then creates an event supplier thread 1007, which can receive user commands from input interfaces (such as the keyboard), and can push the event to the event channel 1011. After the creation of the monitoring coordinator 1004, a user's client and server processes are started. A server or client process may spawn an event consumer thread 1021 or 1029. The event consumer thread pulls the event from the event channel 1011 and performs subsequent actions.

For example, in this process diagram the event channel 1011 is first created and then the event supplier thread 1007 is generated by an application call. The event is published into the event channel 1011, after which a client process 1027 and a server process 1014 may each generate event consumer threads 1029 and 1021. The event consumer threads 1029 and 1021 may be generated simultaneously or at different times. Each consumer thread always listens to the event channel and pulls the event when the event is published in the event channel 1011. Each process then turns on/off the corresponding probes based on the event received by the consumer thread.

Figure 11:
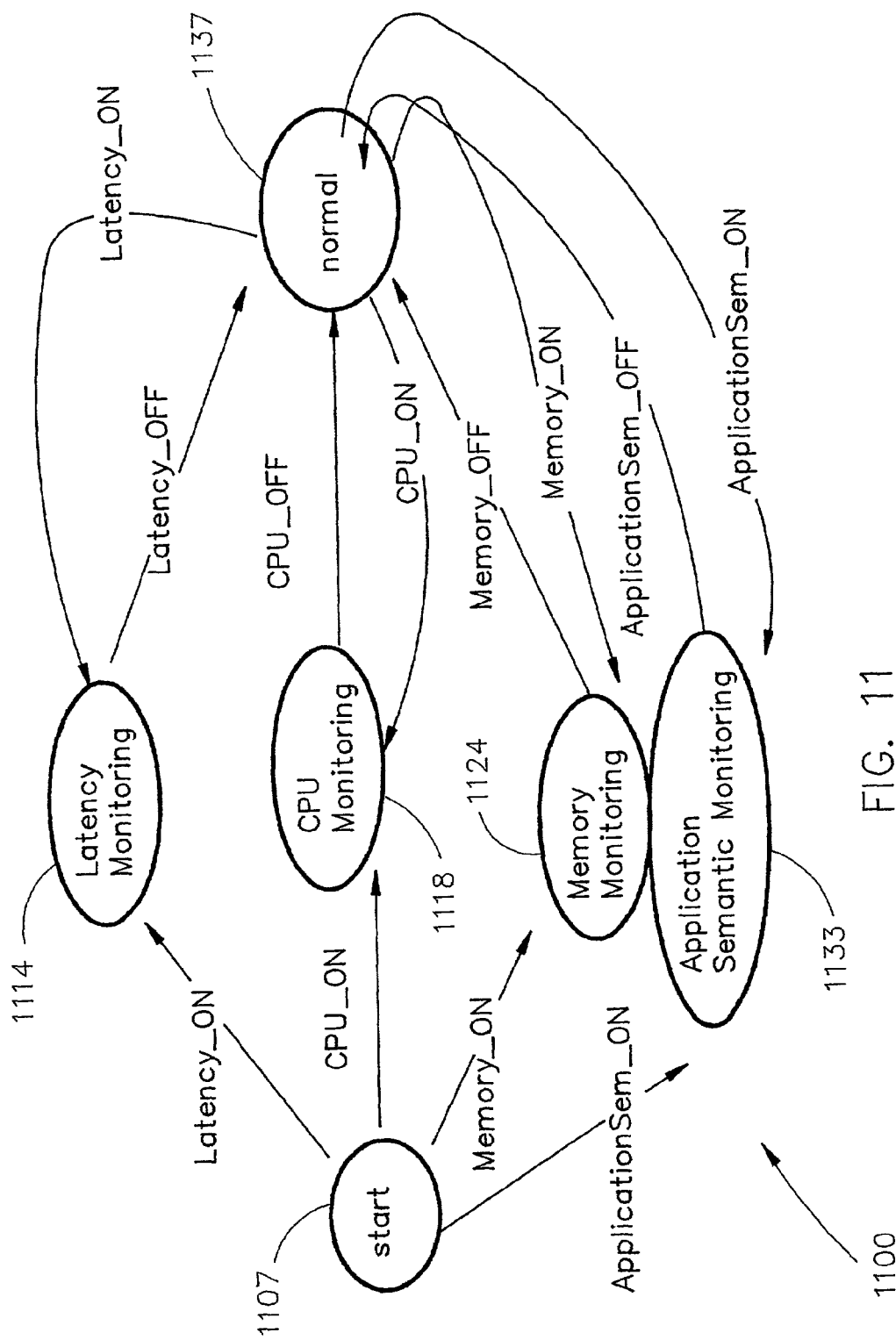
FIG. 11 is a state transition diagram for the selective monitoring framework.

FIG. 11 is a state transition diagram 1100 for the selective monitoring framework. It shows four different monitoring types (application semantics, memory usage, CPU usage, and timing latency). Each monitoring type can be flexibly turned on or off. There are eight different monitoring events: ApplicationSem_ON, ApplicationSem_OFF, Latency_ON, Latency_OFF, CPU_ON, CPU_OFF, Memory_ON, and Memory_OFF. Beginning from the start state, where the monitoring coordinator 1004 starts, the state transition diagram shown in FIG. 11 describes a state protocol for selecting monitoring types.

When a "Latency_ON" command is published by the monitoring coordinator 1004 and is subscribed to by each consumer thread, the monitoring system selects the latency measurement. This also applies for "CPU_ON" and "Memory_ON". In the selective monitoring framework, a single monitoring type can be selected for each monitoring session. A monitoring session is defined as a time interval for the transition from "start" to "normal", or for the transition from "normal" back to "normal". After the monitoring coordinator 1004 issues the monitoring off event of "Latency_OFF", "CPU_OFF," or "Memory_OFF", the monitoring type is terminated and the system goes to the normal state 1137 within a finite amount of time. From the normal state 1137, the system can transition to any other type of monitoring, but not without returning to the normal state 1137. Each event receiver globally sets the monitoring flag to be on or off which is then visible to the entire process with respect to the designated corresponding monitoring type.

As a result, a timing latency monitoring, a shared resource usage monitoring, an application semantics monitoring, and a causality relationship monitoring are capable of being selectively enabled and disabled. Furthermore, a stub start probe, a skeleton start probe, a skeleton end probe, and a stub end probe are capable of being selectively enabled and disabled.

In normal operation, it is possible that a function invocation may occur right before a client or server process receives an "off" event. This may trigger a set of subsequent function invocations and may therefore cause the issuance of a set of dynamically created threads throughout the distributed system 100. As a result, it will be difficult, if not impossible, to determine the reach or duration of a "normal" state in the distributed system 100. It is imperative that these functions and threads execute and are monitored, even though the "off" event has been allowed to execute and the "off" event has been set. Therefore, in some instances the "normal" state should not be immediately reached after the "off" event is set.

To cope with the fact that the reaching of the "normal" state cannot be absolutely determined, the monitoring and the analyzer 110 are designed so that either the monitoring result can be guaranteed to be consistent or that the failure to reach the "normal" state is detected and reported to the user. If the failure is reported, the inconsistency can be avoided in the next run of system monitoring by waiting until the monitoring reaches the "normal" state.

The consistency is defined by two criteria. Criterion 1 is that no required monitoring is discontinued by a state transition, and criterion 2 is that no required monitoring is interfered with by a state transition.

Criterion 1 is always guaranteed by the technique called causal overriding. When a function is invoked by another function, or a thread is created by another thread, the causality relationship is continuously tracked, including the function caller/callee relationship and the thread parent/child relationship. After the "off" event has been received, if a function is still called from another active function requiring the monitoring activation, or if the function is contained in the thread whose parent thread requires the monitoring activation, then this function locally turns on the respective monitoring. The criterion may be set via an application event or via a debugger hook.

An interference happens when the instrumentation probes of the monitoring framework process compete for a shared resource with the original application. Criterion 2 is automatically satisfied for application semantics monitoring, as no shared resource usage is concerned. Criterion 2 can be compensated for by monitoring of the shared resource usage (such as CPU and heap memory usage), as these types of monitoring are thread-based. For shared resource usage monitoring, if the monitoring occurs simultaneously in two different threads then no interference between threads can occur. The only interference left is intra-thread. Since the execution inside a thread is always sequential, the resource spent on the probes (i.e., the interference), can be recorded in log records and be subtracted out later by the analyzer 110.

For the monitoring of timing latency, the interference cannot be easily measured and compensated when there exist multiple functions with different Global Causal Identifier simultaneously executed on the same processor. The difficulty exists because the timing latency interference is across the boundary of the thread, the process, and the processor. As a result, the timing latency interference may become system-wide. In this case, if log data captures the start and end of the function invocation in both the stub and the skeleton, it may be determined whether a particular function is interleaved with another function invocation. If the interleaving does occur, it will become part of the report presented to the user, and the user can take action to reduce or eliminate the interference by employing on-the-fly on/off probing.

Therefore, according to this embodiment of the invention, different monitoring types, such as execution time and timing latency, may be controlled by a user or application in order to minimize impact on the system and confine the monitoring framework only to the degree that is truly desired by the user. For example, the user may wish to turn one or more of the monitoring features off at times when a large amount of processing time is required. This may be done in order to reduce impact on the host computer device running the application. Likewise, at times where the user desires more information on the runtime execution of the application, the user may turn on more of the monitoring types in order to collect additional data. For example, the user may choose to enable more monitoring to understand the root cause if the system is experiencing a large number of exceptions.

The instrumentation probing in the thread library and in the memory management subsystem may be configured to be permanent. However, they may be implemented so that they can be turned on or off to some degree in order to cope with the probes inside the stubs and the skeletons and therefore to minimize the monitoring overhead and interference.

The monitoring framework of the figure may also be employed to achieve a selective component monitoring, wherein a user can specify that a monitoring operation be turned on or off for a software component. For selective component monitoring, an event may be encoded as [host, interface, function, on] or as [host, interface, function, off]. The interface and function fields specify the monitoring function and the associated interface. The host field indicates that only the function invoked from that particular computer device will be monitored. Any one of the first three fields can be absent and replaced by a wildcard operator (such as "*"). The wildcard operator may be interpreted to be any host, any interface, or any function. When such an event is broadcast system-wide through the framework, the monitoring system can enable and disable specific functions.

FIG. 11 is applicable to selective component monitoring, and the corresponding events now become [host, interface, function, on] and [host, interface, function, off]. The casual overriding is still applied to meet Criterion 1. Generally Criterion 2 can be met by interference avoidance through the feedback of the analyzer, similar to the recommended treatment for timing latency monitoring described previously. Moreover, a component monitoring (e.g., Component A) and a data type monitoring (e.g., CPU usage) can be superimposed to form a comprehensive selective monitoring framework. Consequently, a user may control both monitoring aspects in order to tailor the monitoring operation to the needs of the user.

The monitoring and characterization of the invention yield several major advantages. One advantage is an application-centric and thread-based multi-dimensional behavior monitoring and characterization in an integrated framework. The monitoring and characterization system is based on user-defined function calls. Besides causality relationship reconstruction, monitoring includes characterization of system behavior including 1) the application semantics (i.e., function input/output parameters, exceptions occurring during runtime execution, etc.); 2) the end-to-end timing latency of function execution; and 3) the CPU consumption, heap memory usage, and other shared resource consumption for each function call.

Another advantage is a system-wide capturing of resource consumption and timing propagation due to causality tracing of threaded applications. The two types of causality relationships tracked are a function caller-callee relationship and a thread parent-child relationship. By identifying such causality relationships in the distributed system 100, the propagation of timing latency and resource consumption in the distributed system 100 may be captured and recorded.

Yet another advantage of the invention is that the monitoring according to the invention is independent of the hardware platform, independent of the operating system, independent of the communication protocol, and does not need a globally synchronized clock provided in the network. Therefore, the invention enables runtime monitoring of all processes in the network, even multi-threaded, multi-processed and multi-processored functions.

Yet another advantage is an automatic probe insertion by an IDL compiler and a flexible probe activation/deactivation. An IDL compiler can automatically insert software probes into the system code base. The flexible probe activation/deactivation may be accomplished at compilation or at runtime. The interface can be specified, the interface function can be specified, and the monitoring type can be specified (application semantics monitoring, timing latency monitoring, CPU consumption/heap memory usage monitoring, or some combination of these). Moreover, a probe may be designed so that it can be turned on or off when the system is running in order to control the amount of log data information.

Yet another advantage is that by leveraging component technology such as CORBA, COM/DCOM and RMI, the invention is capable of dealing with truly distributed application systems. Consequently, an application system can be multi-threaded, partitioned into different processes, run on different processors, and scheduled and managed by different operating systems.

We claim:

1. A monitoring method for a component-based software system operating over one or more processing devices, comprising the steps of:

initiating an invocation of a second software component from within an execution of a first software component;

recording a stub start log data including a global causal identifier in an instrumented stub before said invocation of said second software component;

transmitting the global causal identifier from the first software component to the second software component wherein the second software component executes on a separate thread and in a system remote from the first software component;

recording a stub end log data including the global causal identifier in said instrumented stub after a response is received from said invocation of said second software component, said response including the global causal identifier;

wherein said stub start log data and said stub end log data gather runtime information about execution of said second software component within said component-based software system;

wherein a log data contents is configured during operation of said component-based software system; and wherein a runtime information generated during said operation of said component-based software system includes a regular expression that determines a particular log data contents, and wherein a user is capable of changing said particular log data contents during said operation of said component-based software system by setting said regular expression.

2. A monitoring method for a component-based software system operating over one or more processing devices, comprising the steps of:

initiating an invocation of a second software component from within an execution of a first software component;

recording a stub start log data including a global causal identifier in an instrumented stub before said invocation of said second software component;

transmitting the global causal identifier from the first software component to the second software component wherein the second software component executes on a separate thread and in a system remote from the first software component;

recording a stub end log data including the global causal identifier in said instrumented stub after a response is received from said invocation of said second software component, said response including the global causal identifier;

wherein said stub start log data and said stub end log data gather runtime information about execution of said second software component within said component-based software system;

wherein a log data contents is configured during operation of said component-based software system;

initiating said invocation of said second software component from within an execution of an instrumented skeleton;

recording a skeleton start log data before said instrumented skeleton invokes said second software component; and recording a skeleton end log data in said instrumented skeleton after a response is received from said invocation of said second software component; and wherein a particular instrumented stub is capable of enabling and disabling a data logging capability of a corresponding instrumented skeleton.

3. A computer system adapted to monitor component-based software applications, comprising:

at least one processing device residing in said computer system; one or more software components residing on said at least one processing device and capable of executing in said computer system;

at least one other processing device residing remotely from said computer system, the at least one other processing device having one or more software components residing therein;

one or more instrumented stubs in said one or more software components, with an instrumented stub being capable of recording a stub start log data at an execution invocation of said instrumented stub in a first software component and recording a stub end log data at an execution conclusion of said instrumented stub, said stub start log data and said stub end log data including a global causal identifier and wherein said one or more instrumented stubs is configured to transmit said global causal identifier from one of the software components in the at least one processing device to at least one other component in the at least one other processing device;

a persistent storage capable of collecting a plurality of log data;

an analyzer communicating with said persistent storage and capable of retrieving and analyzing log data from said persistent storage; and a monitoring coordinator communicating with one or more instrumented, component-based software applications and capable of enabling or disabling instrumented stubs and instrumented skeletons.

* * * * *